United States Patent
Nakanishi

(10) Patent No.: US 9,900,604 B2
(45) Date of Patent: Feb. 20, 2018

(54) SEMICONDUCTOR INTEGRATED CIRCUIT, IMAGE TRANSMISSION APPARATUS AND IMAGE TRANSMISSION SYSTEM

(71) Applicant: KABUSHIKI KAISHA TOSHIBA, Minato-ku, Tokyo (JP)

(72) Inventor: Keiri Nakanishi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/061,911

(22) Filed: Mar. 4, 2016

(65) Prior Publication Data

US 2016/0267683 A1 Sep. 15, 2016

Related U.S. Application Data

(60) Provisional application No. 62/131,569, filed on Mar. 11, 2015.

(51) Int. Cl.
  *G06K 9/36* (2006.01)
  *H04N 19/176* (2014.01)
  *H04N 19/15* (2014.01)
  *H04N 19/124* (2014.01)
  *H04N 19/154* (2014.01)
  *H04N 19/507* (2014.01)

(52) U.S. Cl.
  CPC ......... *H04N 19/176* (2014.11); *H04N 19/124* (2014.11); *H04N 19/15* (2014.11); *H04N 19/154* (2014.11); *H04N 19/507* (2014.11)

(58) Field of Classification Search
  CPC .. H04N 19/124; H04N 19/136; H04N 19/147; H04N 19/15; H04N 19/156; G09G 5/003; G09G 5/006
  See application file for complete search history.

(56) References Cited

U.S. PATENT DOCUMENTS

2003/0169934 A1* 9/2003 Naito ............... H04N 19/176
                                                                  382/239
2008/0240583 A1* 10/2008 Jones ............... H04N 19/147
                                                                  382/232

(Continued)

FOREIGN PATENT DOCUMENTS

JP     2012-221085 A     11/2012
JP     2013-186469 A     9/2013

OTHER PUBLICATIONS

Sullivan, Gary J., and Thomas Wiegand. "Rate-distortion optimization for video compression." IEEE signal processing magazine 15.6 (1998): 74-90.*

*Primary Examiner* — Li Liu

(74) *Attorney, Agent, or Firm* — Knobbe, Martens, Olson & Bear, LLP

(57) ABSTRACT

A semiconductor integrated circuit according to an embodiment includes a compressor, a compression distortion detector, and an image-quality adjusting-parameter generator. The compressor generates a compressed image of an original image output from a host apparatus based on an image-quality adjusting parameter. The compression distortion detector detects a compression distortion of the compressed image. The image-quality adjusting-parameter generator updates the image-quality adjusting parameter based on the compression distortion.

16 Claims, 17 Drawing Sheets

(56) References Cited

U.S. PATENT DOCUMENTS

| | | | |
|---|---|---|---|
| 2009/0092186 A1* | 4/2009 | Otsuka | H04N 19/147 375/240.02 |
| 2010/0195921 A1* | 8/2010 | Weissman | H03M 7/30 382/232 |
| 2010/0254448 A1* | 10/2010 | Xu | H04N 19/00551 375/240.02 |
| 2011/0052087 A1* | 3/2011 | Mukherjee | H04N 19/46 382/248 |
| 2012/0120083 A1 | 5/2012 | Kong et al. | |
| 2012/0256924 A1 | 10/2012 | Uema | |
| 2013/0235055 A1 | 9/2013 | Kim et al. | |
| 2013/0235941 A1 | 9/2013 | Koo et al. | |
| 2014/0010282 A1* | 1/2014 | He | H04N 21/23439 375/240.02 |

* cited by examiner

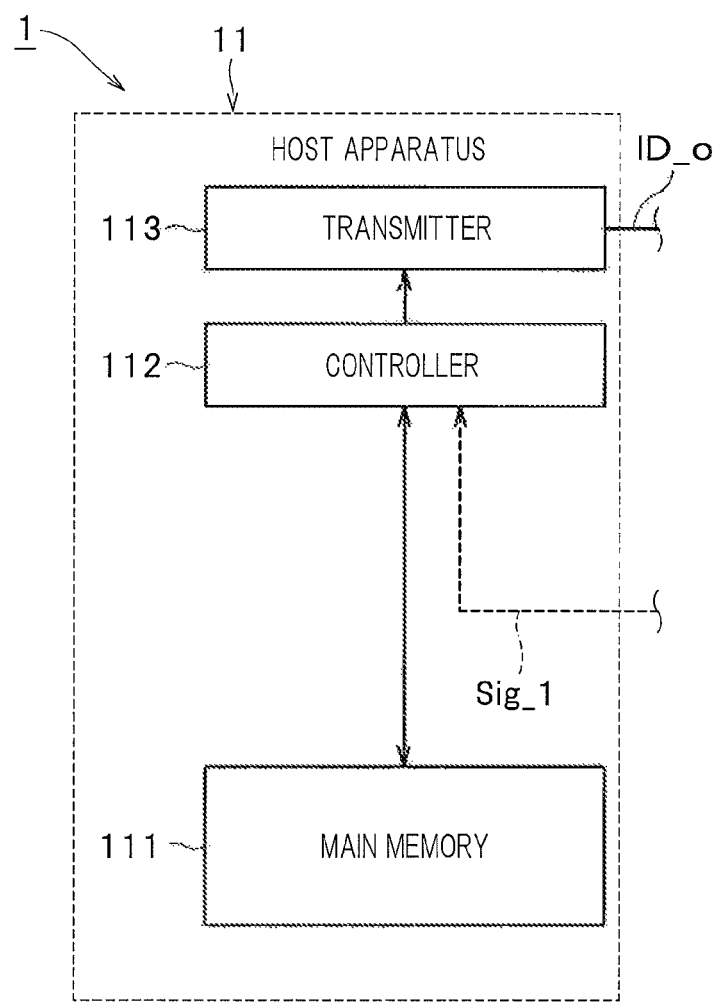
F I G. 1A

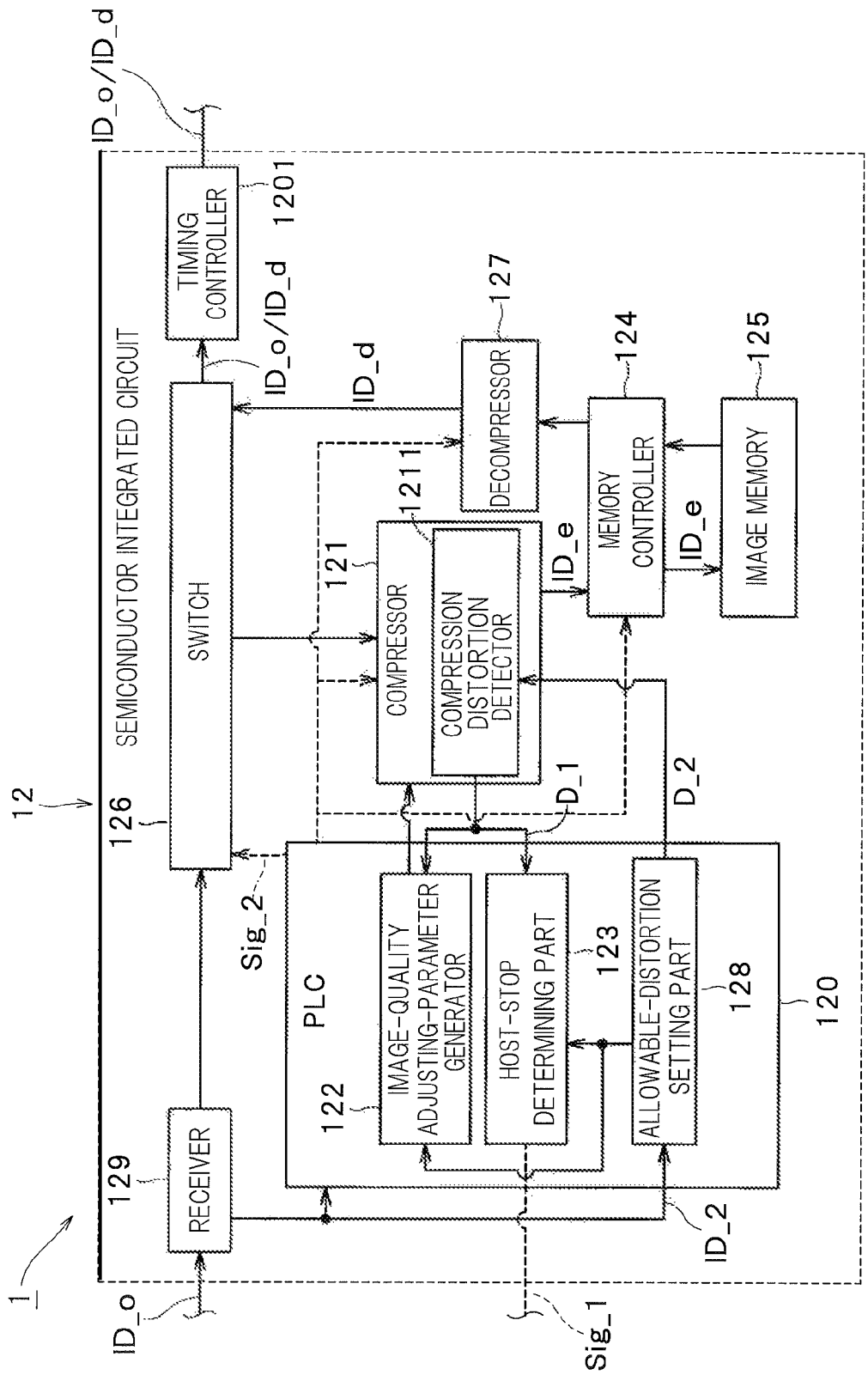
F I G. 1B

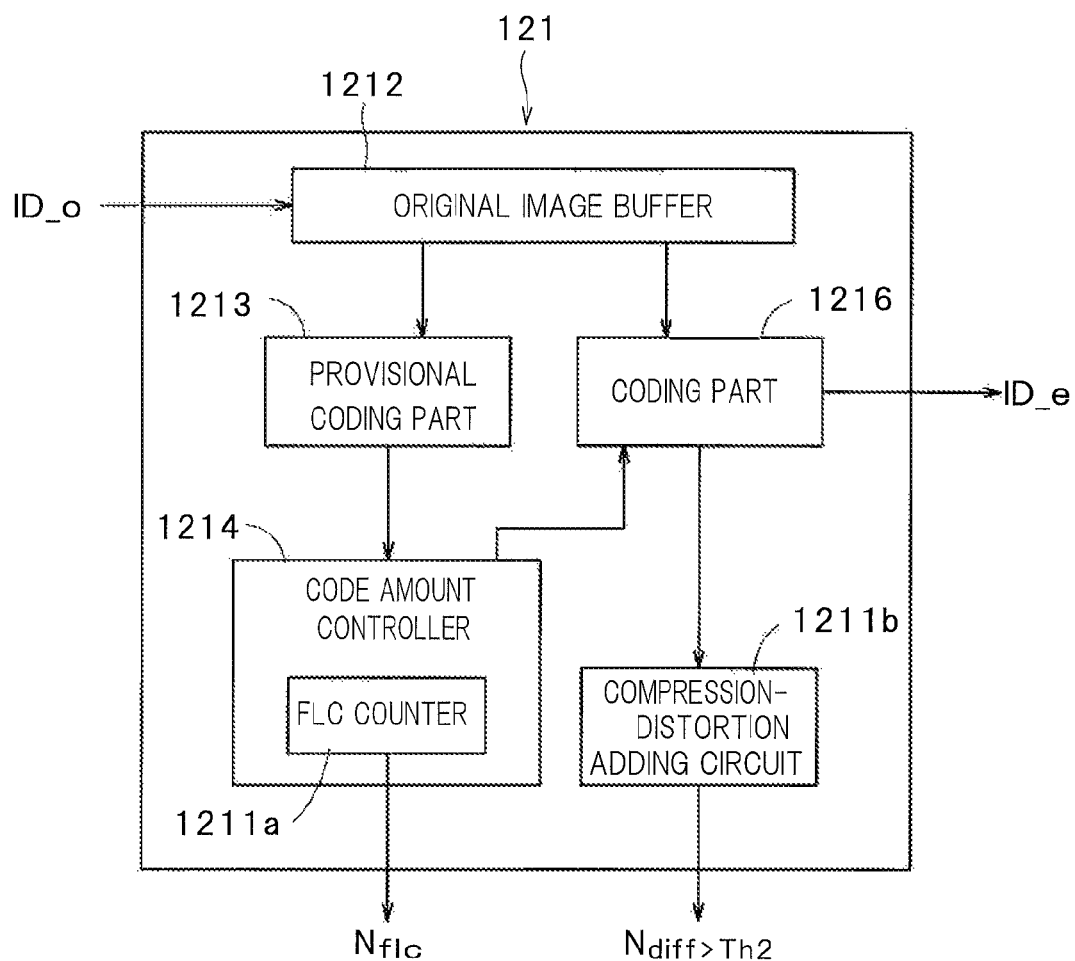
F I G. 2

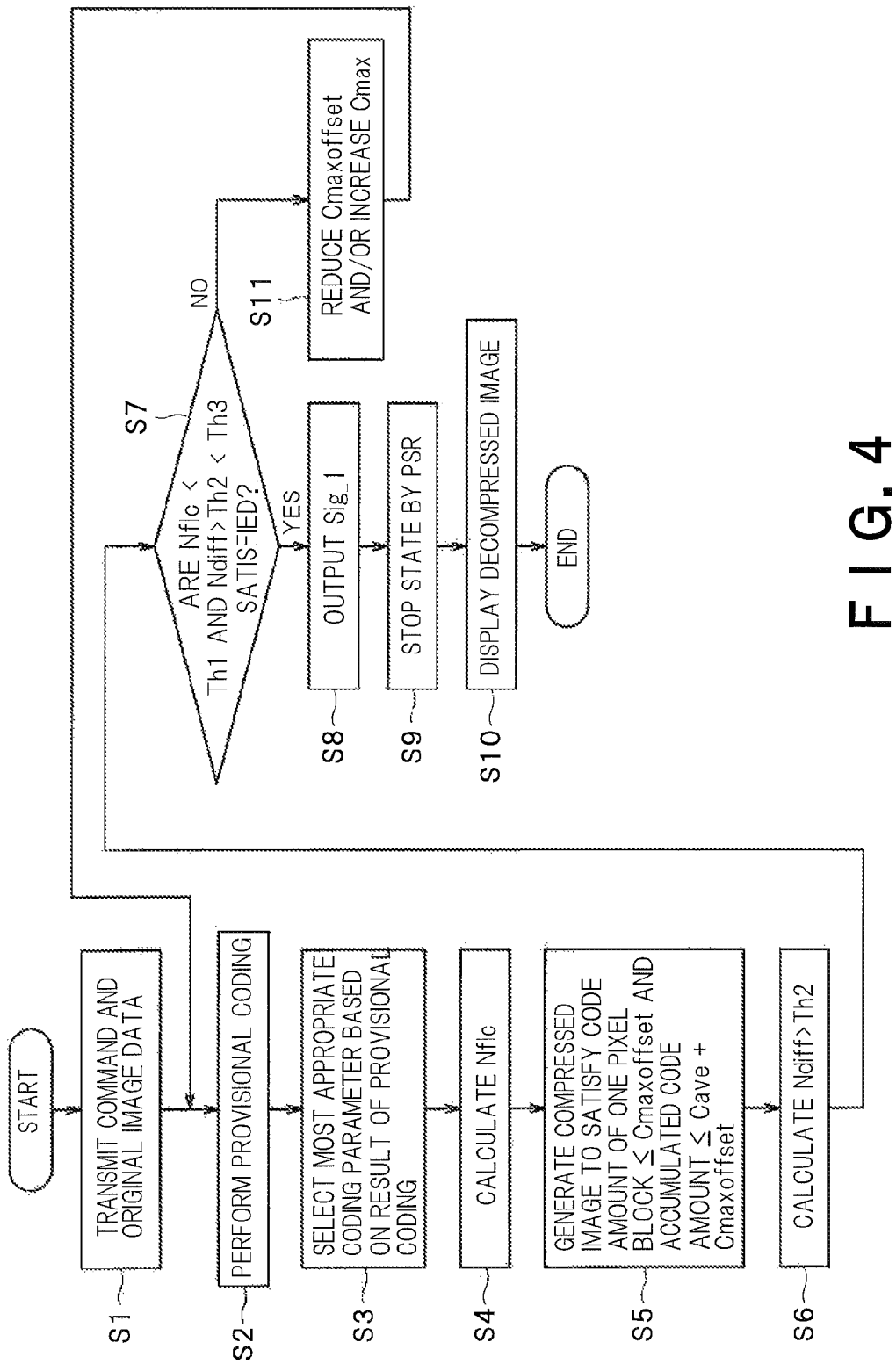
F I G. 4

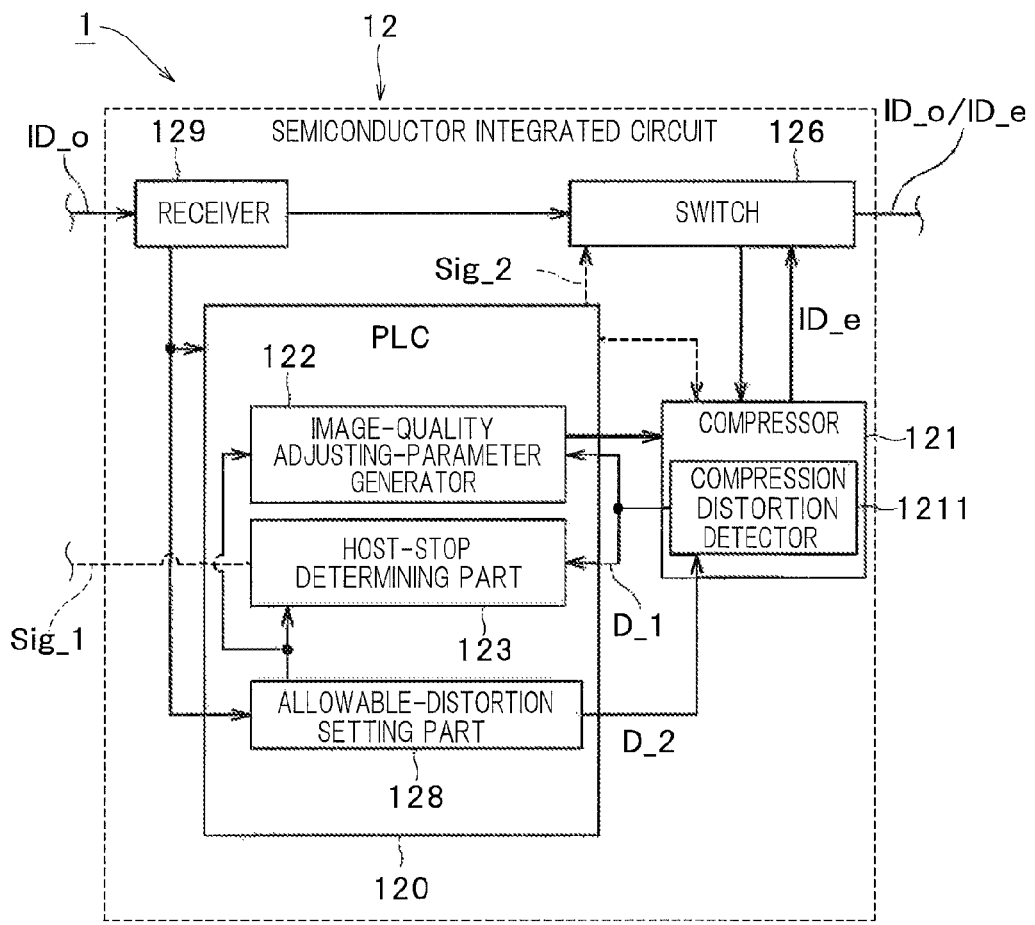
F I G. 5A

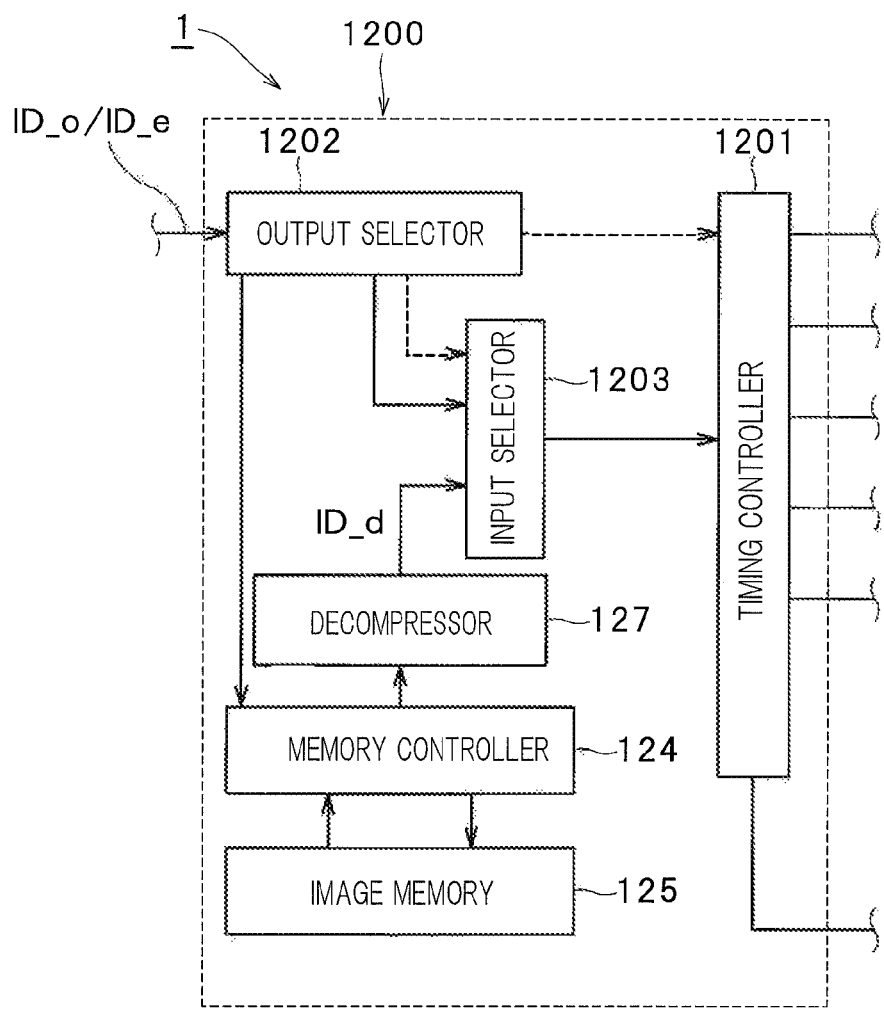
F I G. 5B

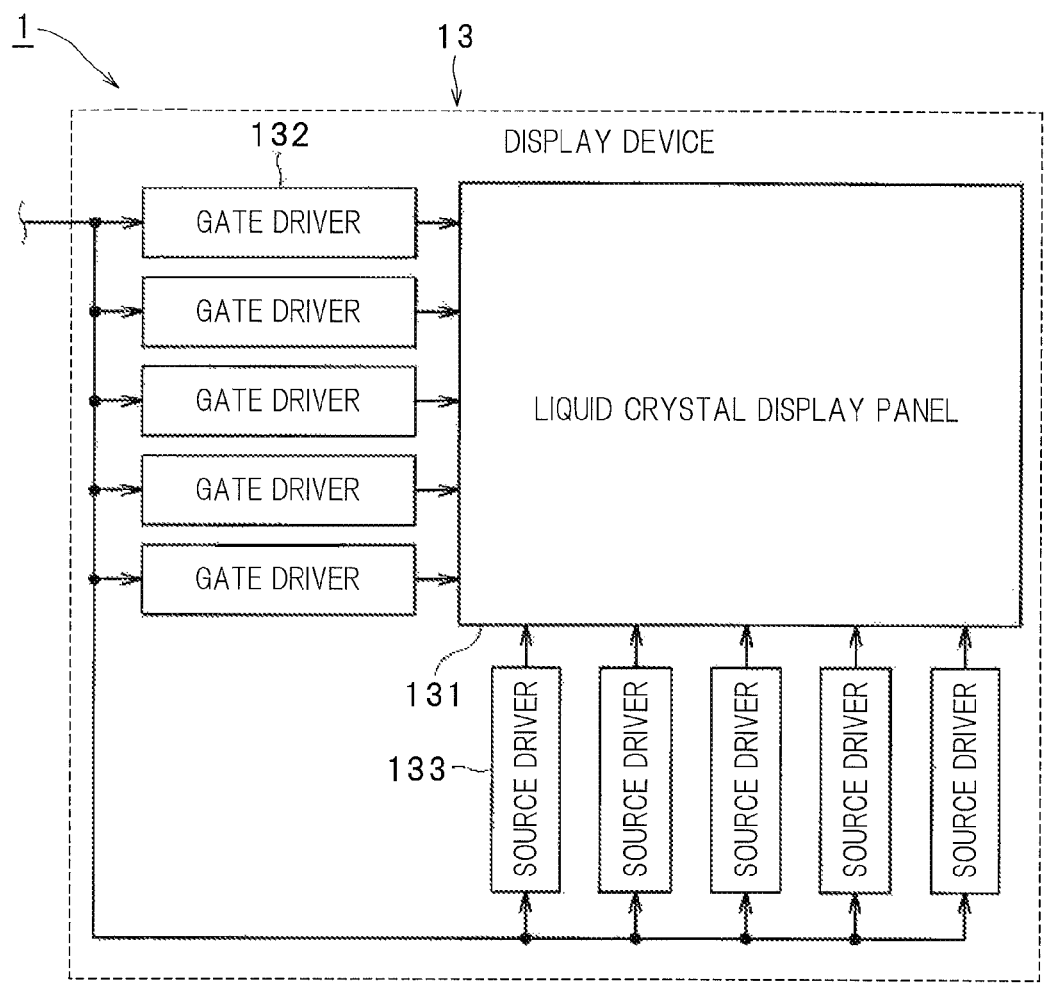
F I G. 5C

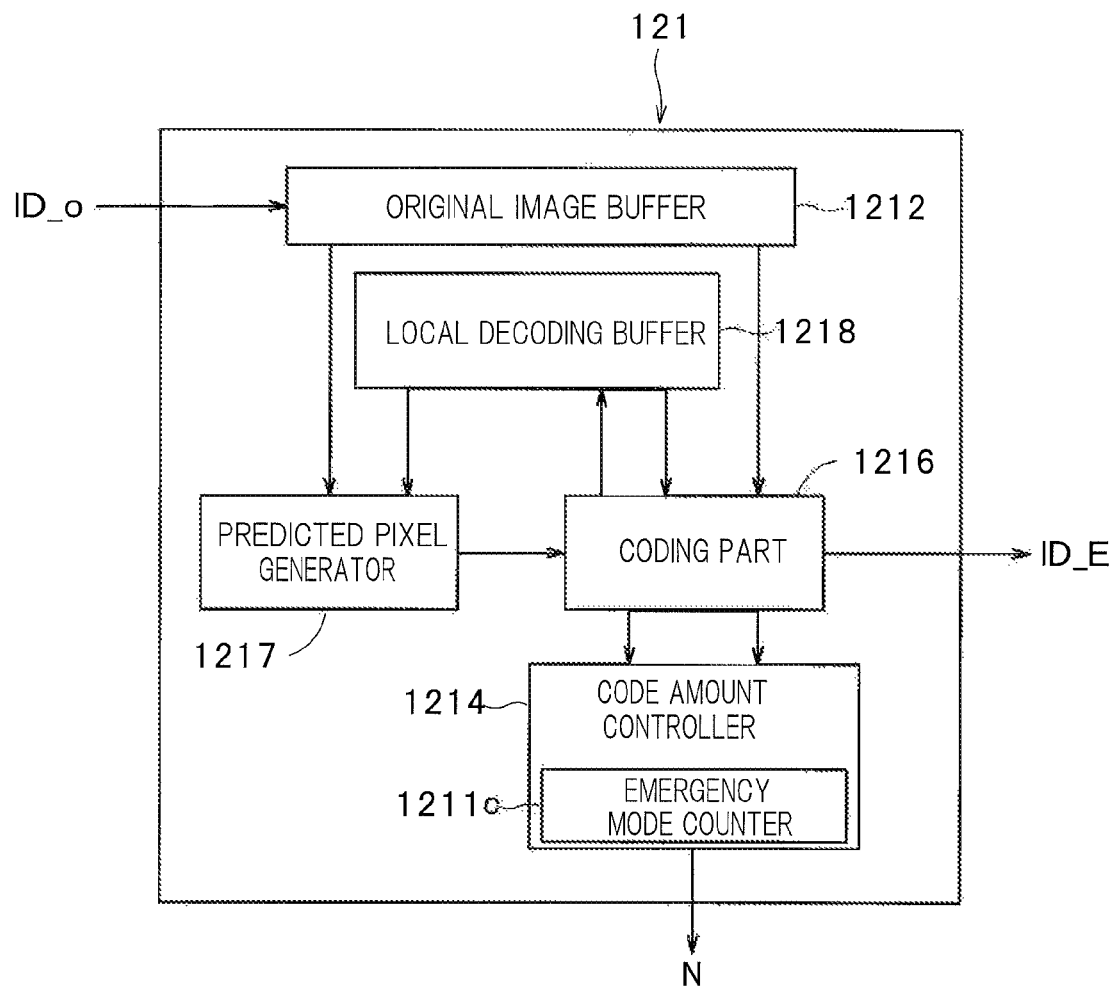
F I G. 6

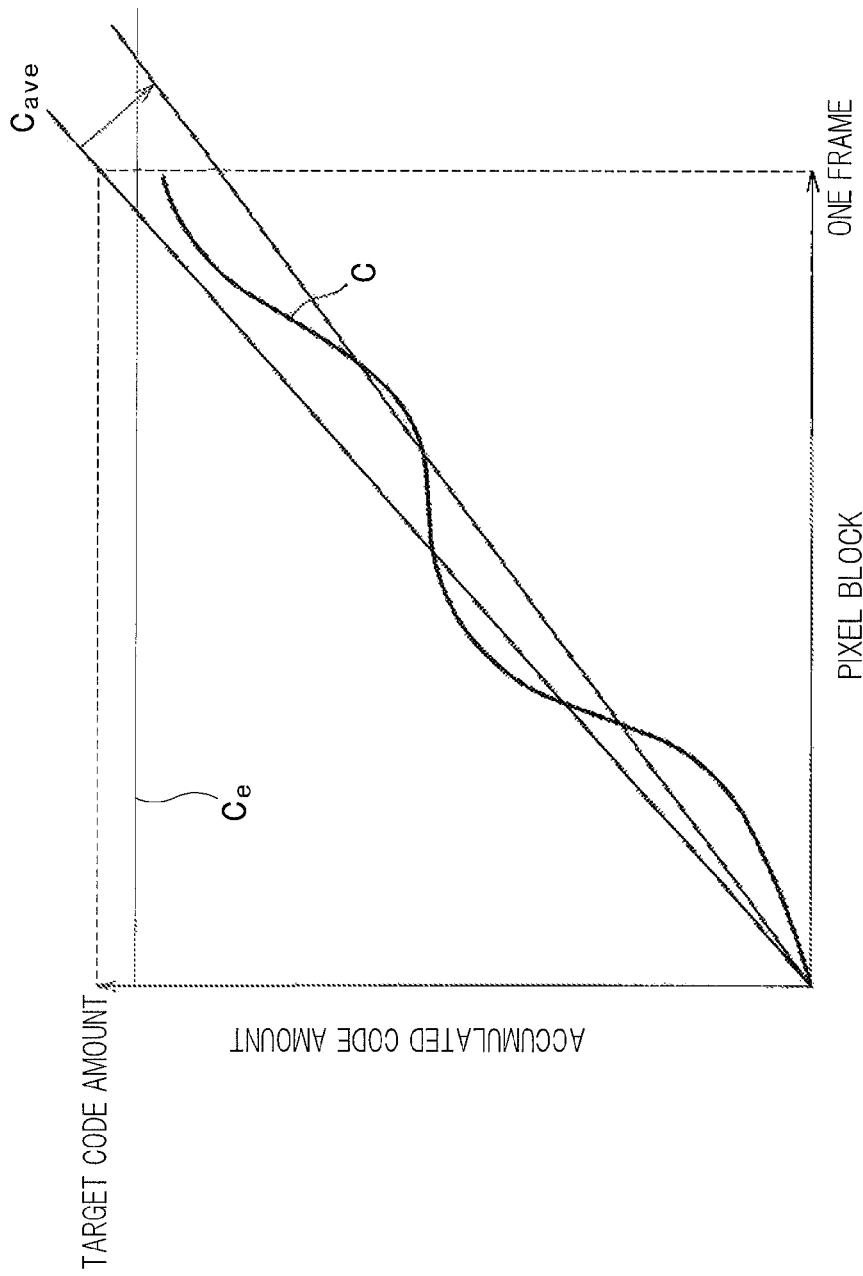
F I G. 7

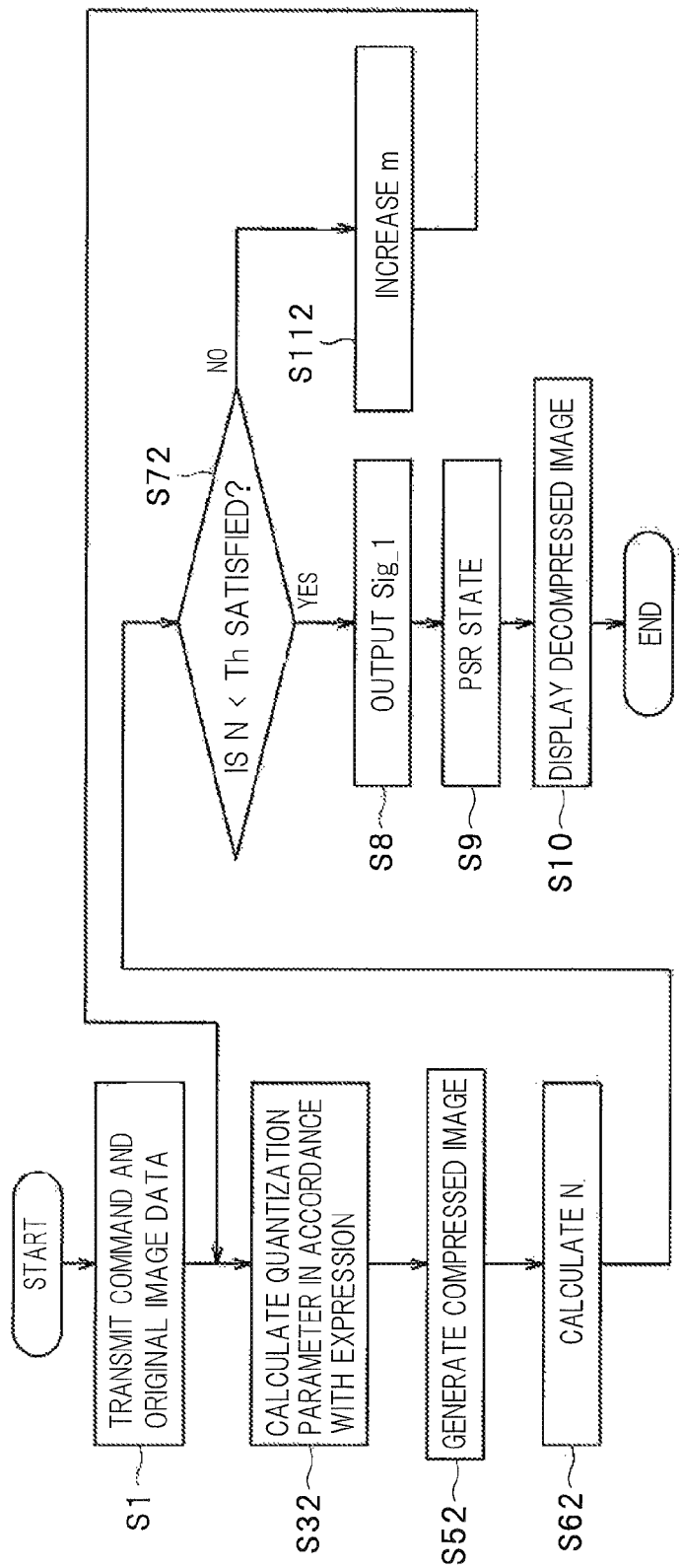
F I G. 8

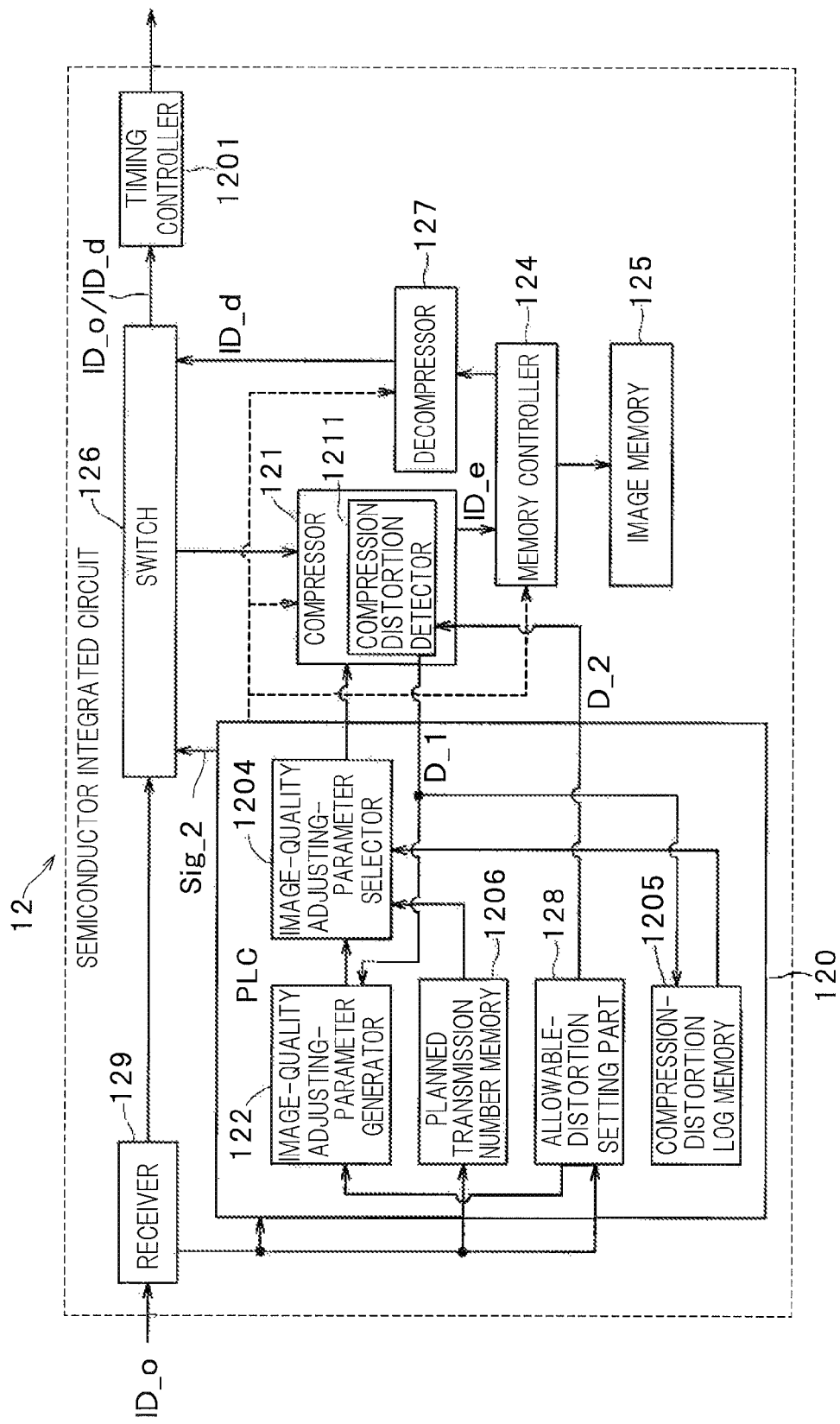
F I G. 9

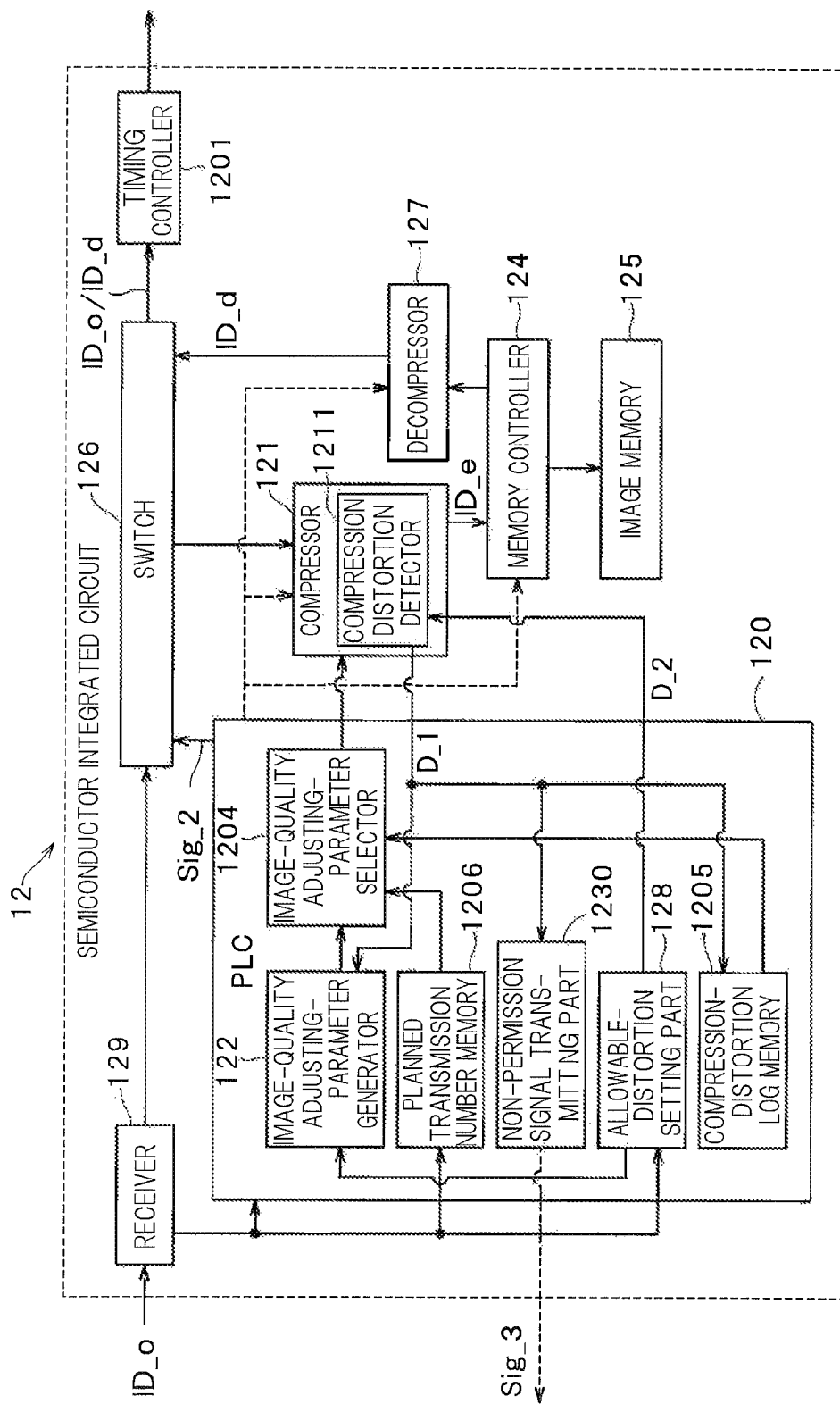
F I G. 11

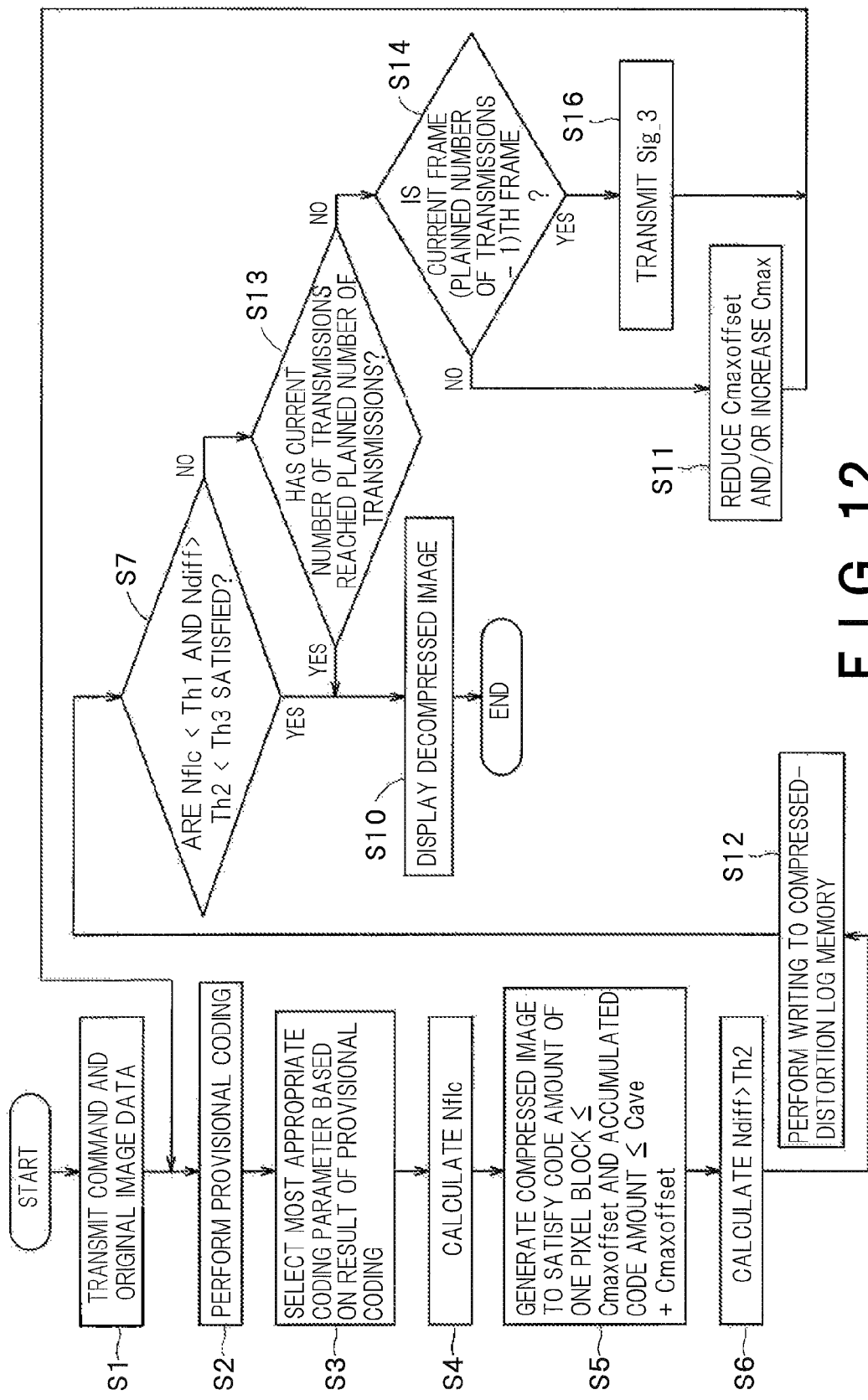
F I G. 12

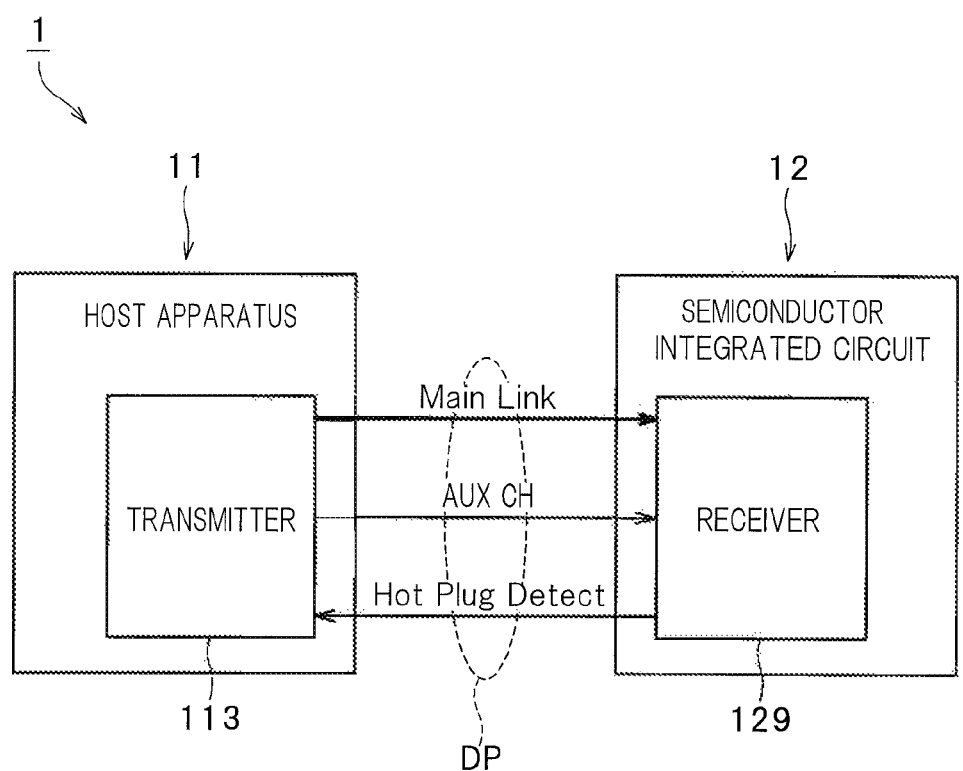
F I G. 13

SEMICONDUCTOR INTEGRATED CIRCUIT, IMAGE TRANSMISSION APPARATUS AND IMAGE TRANSMISSION SYSTEM

CROSS REFERENCE TO RELATED APPLICATIONS

This application is based upon and claims the benefit of priority from the prior U.S. Provisional Patent Application No. 62/131,569 filed on Mar. 11, 2015, the entire contents of which are incorporated herein by reference.

FIELD

Embodiments relate to a semiconductor integrated circuit, an image transmission apparatus, and an image transmission system.

BACKGROUND

Panel self refresh (hereinafter, also "PSR") is known as a technique for transmitting an image to a display panel. PSR is processing in which a frame (an image) transmitted from a host apparatus to a display panel is held in a frame memory and, in a case where a next frame transmitted from the host apparatus is the same as that in the frame memory, the host apparatus is stopped and the frame in the frame memory is transmitted to the display panel. The use of the frame memory can reduce power consumption by transmission of the frame by the host apparatus to the display panel.

Further, in PSR, a compressed (coded) frame is held in the frame memory for reducing the cost of the frame memory.

However, there is a problem that in a case where a compression ratio is not sufficient, the frame cannot be stored in the frame memory because of the limited capacity of the frame memory and PSR cannot be started. On the other hand, in a case where the frame is compressed at a high compression ratio so that the frame can be stored in the frame memory, a distortion of an image (an error from an original image, hereinafter, also "compression distortion") is caused by compression and deteriorates image quality.

Therefore, it is demanded to achieve both the reduction in the power consumption and the improvement of the image quality simultaneously.

BRIEF DESCRIPTION OF THE DRAWINGS

FIGS. 1A to 1C are diagrams of an image transmission system 1 according to a first embodiment;

FIG. 2 is a diagram of a compressor 121 of the image transmission system 1 in FIGS. 1A to 1C;

FIG. 4 is a flowchart of the image transmission system 1 in FIGS. 1A to 1C;

FIGS. 5A to 5C are diagrams of the image transmission system 1 according to a modification of the first embodiment;

FIG. 6 is a diagram of the compressor 121 according to a second embodiment;

FIG. 7 is a diagram showing code amount control by the compressor 121 in FIG. 6;

FIG. 8 is a flowchart of the image transmission system 1 according to the second embodiment;

FIG. 9 is a diagram of the image transmission system 1 according to a third embodiment;

FIG. 11 is a diagram of the image transmission system 1 according to a fourth embodiment;

FIG. 12 is a flowchart of the image transmission system 1 according to the fourth embodiment; and FIG. 13 is a diagram of the image transmission system 1 according to a fifth embodiment.

DETAILED DESCRIPTION

Embodiments will now be explained with reference to the accompanying drawings. The present invention is not limited to the embodiments.

According to an embodiment, a semiconductor integrated circuit includes a compressor, a compression distortion detector, and an image-quality adjusting-parameter generator. The compressor generates a compressed image of an original image output from a host apparatus based on an image-quality adjusting parameter. The compression distortion detector detects a compression distortion of the compressed image. The image-quality adjusting-parameter generator updates the image-quality adjusting parameter based on the compression distortion.

First Embodiment

First, as a first embodiment, an image transmission system 1 that causes a host apparatus to stop an output of an original image based on a compression distortion is described.

Figure 1C:
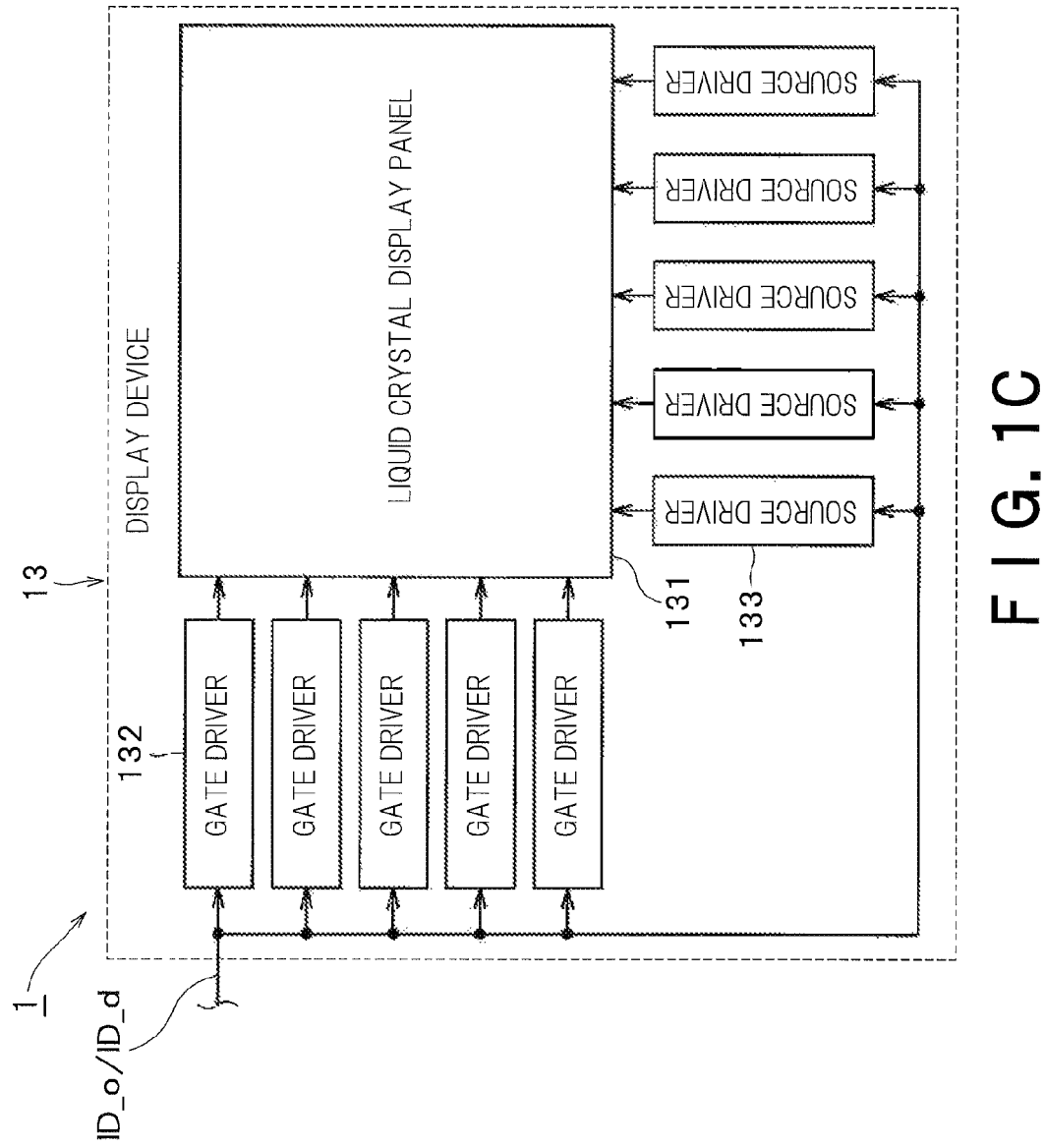

FIGS. 1A to 1C are diagrams of the image transmission system 1 according to the first embodiment. Specifically, FIG. 1A is a diagram of a host apparatus 11, FIG. 1B is a diagram of a semiconductor integrated circuit 12, and FIG. 1C is a diagram of a display device 13. FIG. 2 is a diagram of a compressor 121 of the image transmission system 1. In FIGS. 1A to 1C and 2, a solid arrow connecting components represents data, and a broken arrow represents a control signal. The image transmission system 1 can be used in an image (video) display system having a PSR function, for example.

The image transmission system 1 includes the host apparatus 11, the semiconductor integrated circuit 12, and the display device 13.

(Host Apparatus 11)

The host apparatus 11 in FIG. 1A includes a main memory 111, a controller 112, and a transmitter 113. The main memory 111 may be a DRAM (Dynamic Random Access Memory), for example. The controller 112 may be an application processor, for example.

Original image data ID_o before being compressed is stored in the main memory 111. The controller 112 reads out the original image data ID_o from the main memory 111. Also, the controller 112 transmits (outputs) image data read out to the semiconductor integrated circuit 12 via the transmitter 113. The controller 112 may transmit the original image data ID_o in the unit of the frames in accordance with a predetermined frame rate (a transmission rate).

The controller 112 can also receive a signal for permitting stop of an output (hereinafter, "output-stop permission signal") Sig_1 from the semiconductor integrated circuit 12. The output-stop permission signal Sig_1 is a signal that permits the host apparatus 11 to stop the output of the original image for PSR.

By receiving the output-stop permission signal Sig_1, the controller 112 stops transmission of the original image data ID_o (that is, a stop state is caused by PSR). Thus, power consumption can be reduced.

(Semiconductor Integrated Circuit 12)

The semiconductor integrated circuit 12 is hardware operating therein. The semiconductor integrated circuit 12 may be an ASIC (Application Specific Integrated Circuit) (a bridge chip) provided with an eDRAM (Embedded DRAM) or a SRAM (Static Random Access Memory), for example.

The semiconductor integrated circuit 12 in FIG. 1B includes the compressor 121, a compression distortion detector 1211, an image-quality adjusting-parameter generator 122, a host-stop determining part 123, a memory controller 124, an image memory 125, a switch 126, a decompressor 127, an allowable-distortion setting part 128, a receiver 129, and a timing controller 1201. The image-quality adjusting-parameter generator 122, the host-stop determining part 123, and the allowable-distortion setting part 128 are incorporated in a programmable logic controller (hereinafter, also "PLC") 120.

The compression distortion detector 1211 is incorporated in the compressor 121. Specifically, the compression distortion detector 1211 includes an FLC counter 1211a and a compression-distortion adding circuit 1211b, as shown in FIG. 2. The compressor 121 also includes an original image buffer 1212, a provisional coding part 1213, a code amount controller 1214, and a coding part 1216, as shown in FIG. 2. The FLC counter 1211a is incorporated in the code amount controller 1214.

(Compressor 121)

The compressor 121 generates a compressed image of an original image output from the host apparatus 11 based on an image-quality adjusting parameter. The image-quality adjusting parameter is used for compression of the original image and is updated (generated) based on a compression distortion.

Figure 3:
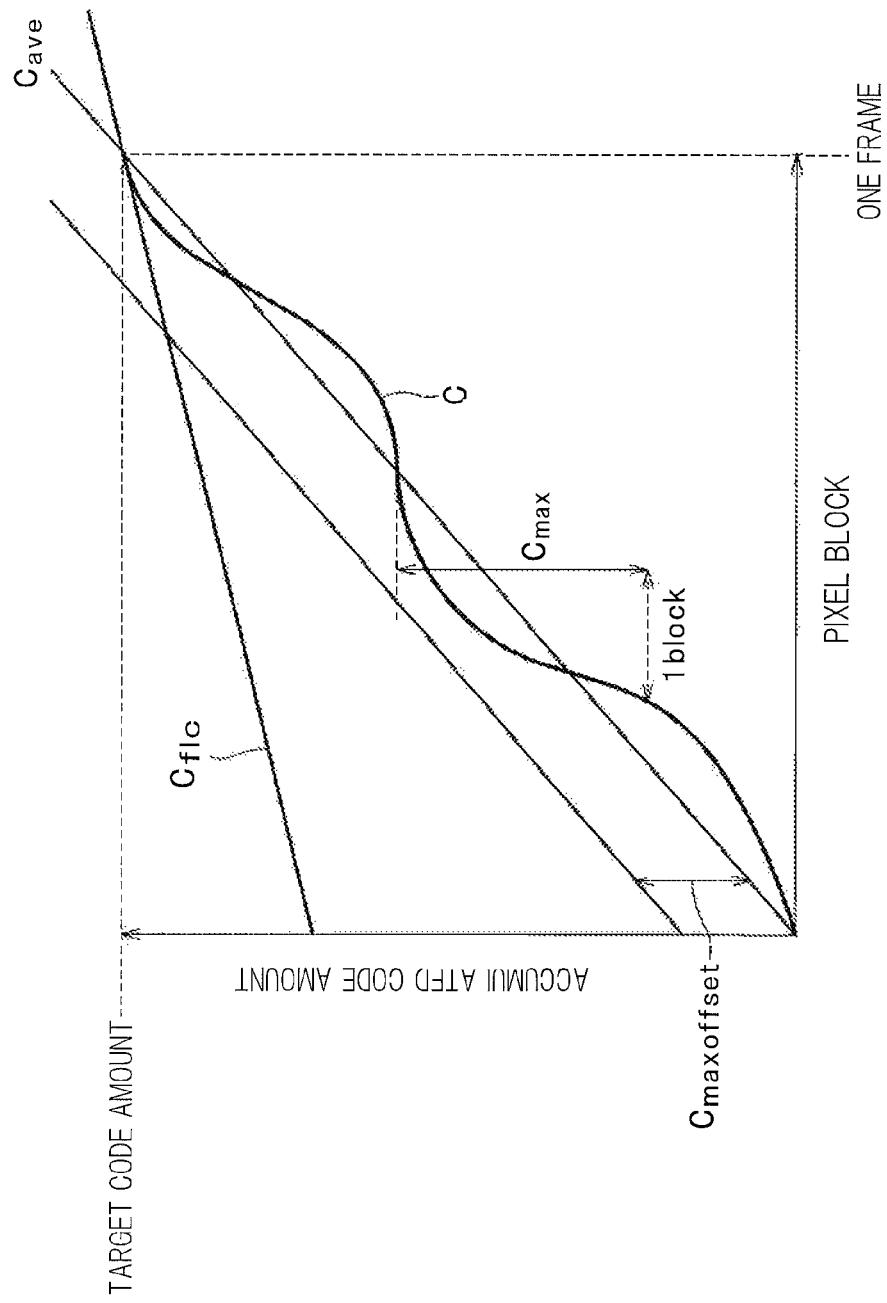
FIG. 3 is a diagram showing code amount control by the compressor 121 in FIG. 2.

FIG. 3 is a diagram showing code amount control by the compressor 121 in FIG. 2. For example, the image-quality adjusting parameter includes a maximum accumulated code amount $C_{maxoffset}$ added to an average accumulated code amount $C_{ave}$, and a maximum code amount $C_{max}$ of a pixel block that is a unit of compression by the compressor 121. An accumulated code amount is the code amount of compressed data that is accumulated (increases) in a process of sequentially compressing one frame of the original image data ID_o in the unit of pixel blocks. The average accumulated code amount $C_{ave}$ is an average accumulated code amount (an accumulation rate) of the accumulated code amount. The maximum accumulated code amount $C_{maxoffset}$ is a maximum allowable amount of an offset (an excess amount) of the accumulated code amount with respect to the average accumulated code amount. As shown in FIG. 3, when the horizontal axis and the vertical axis are respectively assumed as a pixel block and the accumulated code amount, for example, the average accumulated code amount $C_{ave}$ can be represented as a straight line having a constant inclination (a primary expression). The maximum accumulated code amount $C_{maxoffset}$ can be represented as a straight line that has the same inclination as that of the average accumulated code amount $C_{ave}$ but has an increased intercept. The maximum code amount $C_{max}$ of a pixel block is the maximum value of the code amount of the pixel block that is allowable when the pixel block is coded.

The compressor 121 acquires (inputs) the original image data ID_o via the receiver 129 and the switch 126. The original image buffer 1212 temporarily stores the original image data ID_o therein and thereafter outputs the original image data ID_o to the provisional coding part 1213 and the coding part 1216.

The provisional coding part 1213 performs provisional coding of the original image data ID_o in the unit of pixel blocks sequentially by a combination of differential pulse code modulation (DPCM), quantization (Q), and variable length coding (VLC), for example. The provisional coding referred herein is provisional coding (compression) for calculating the most appropriate coding parameter to be used for definitive coding of the original image data ID_o. The provisional coding part 1213 performs provisional coding using a coding parameter that is different for each pixel block. The coding parameter is a quantization parameter (QP) used in quantization (Q), for example. The coding parameter may include a table used in variable length coding.

The provisional coding part 1213 generates a compressed image with variable length codes when the accumulated code amount does not reach a predetermined amount $C_{flc}$, and with fixed length codes (FLC) after the accumulated code amount becomes larger than the predetermined amount $C_{flc}$. Hereinafter, the predetermined amount $C_{flc}$ is also described as a FLC boundary code amount $C_{flc}$.

The FLC boundary code amount $C_{flc}$ can be represented as a straight line having a constant inclination (a primary expression) (see FIG. 3).

The provisional coding part 1213 outputs a result of the provisional coding for each pixel block (for example, the quantization parameter or the accumulated code amount) to the code amount controller 1214.

The code amount controller 1214 receives the result of the provisional coding and calculates the most appropriate coding parameter. Specifically, the code amount controller 1214 acquires the image-quality adjusting parameter from the image-quality adjusting-parameter generator 122. The code amount controller 1214 then compares the image-quality adjusting parameter and the result of the provisional coding for each pixel block, and selects the most appropriate coding parameter from the result of the provisional coding. For example, in a case of the quantization parameter, a quantization parameter having a minimum width of quantization is selected. The quantization parameter having the minimum width of quantization is a parameter that satisfies Expressions (1) and (2) shown below in the provisional coding using the quantization parameter.

$$\text{Code amount of one pixel block Maximum code amount } C_{max} \quad (1)$$

$$\text{Accumulated code amount Maximum accumulated code amount } C_{maxoffset} + \text{Average accumulated code amount } C_{ave} \quad (2)$$

In Expressions (1) and (2), the left side represents a value obtained by the provisional coding using the quantization parameter having the minimum width of quantization, and the right side represents the image-quality adjusting parameter. Therefore, the quantization parameter having the minimum width of quantization is calculated based on the image-quality adjusting parameter. Therefore, the compressed image using the quantization parameter having the minimum width of quantization is generated based on the image-quality adjusting parameter.

It is possible to obtain a compressed image that is excellent in image quality by calculating the most appropriate coding parameter based on the image-quality adjusting parameter.

The code amount controller 1214 outputs the calculated coding parameter to the coding part 1216. The coding part 1216 performs coding (compression or compression coding) of the original image data ID_o (the entire frame) using the coding parameter by a combination of differential pulse code modulation and variable length coding. The coding part 1216 also performs fixed length coding when the accumulated code amount becomes larger than the FLC boundary code amount $C_{flc}$.

As described above, the compressor 121 generates the compressed image based on the image-quality adjusting parameter. Specifically, the compressor 121 generates the compressed image in such a manner that the code amount of a pixel block is equal to or smaller than the maximum code amount $C_{max}$ and the accumulated code amount is equal to or smaller than the sum of the average accumulated code amount $C_{ave}$ and the maximum accumulated code amount $C_{maxoffset}$. In a case where Expressions (1) and (2) are not satisfied, the compressor 121 generates the compressed image by fixed length coding (FLC).

The compressor 121 outputs image data ID_e of the compressed image to the memory controller 124.

(Compression Distortion Detector 1211)

The compression distortion detector 1211 detects a compression distortion of a compressed image.

Specifically, the FLC counter 1211a counts (detects) the number $N_{flc}$ of pixel blocks for which fixed length coding has been performed in the provisional coding as the compression distortion, based on the result of the provisional coding for each pixel block.

The compression-distortion adding circuit 1211b acquires the compressed image from the coding part 1216. The compression-distortion adding circuit 1211b then detects, as the compression distortion, the number $N_{diff>Th2}$ of pixel blocks for each of which a difference value between the original image and a decompressed image obtained by decompression of the compressed image (hereinafter, also "image difference value") is larger than a second threshold value Th2. The decompressed image is a local decoded image obtained by decompression of the compressed image by a local decoder (not shown) of the compressor 121. The image difference value is a value obtained by adding a difference (an absolute value) of a pixel value between corresponding pixels in the original image and the decompressed image in the pixel block. The pixel value referred herein is a color difference value, a brightness value, or an RGB value, for example.

The compression distortion detector 1211 outputs data D_1 including the compression distortion $N_{flc}$ and $N_{diff>Th2}$ to the image-quality adjusting-parameter generator 122 and the host-stop determining part 123.

(Image-Quality Adjusting-Parameter Generator 122)

The image-quality adjusting-parameter generator 122 updates the image-quality adjusting parameter based on the compression distortion (D_1). Specifically, the image-quality adjusting-parameter generator 122 updates the image-quality adjusting parameter based on the number $N_{flc}$ of pixel blocks for which fixed length coding has been performed and the number $N_{diff>Th2}$ of pixel blocks for each of which the image difference value is larger than the second threshold value Th2.

More specifically, the image-quality adjusting-parameter generator 122 determines whether the number $N_{flc}$ of pixel blocks for which fixed length coding has been performed is smaller than a first threshold value Th1.

The image-quality adjusting-parameter generator 122 also determines whether the number $N_{diff>Th2}$ of pixel blocks for each of which the image difference value is larger than the second threshold value Th2 is smaller than a third threshold value Th3.

The image-quality adjusting-parameter generator 122 then decides the image-quality adjusting parameter when the number $N_{flc}$ of pixel blocks has been determined to be smaller than the first threshold value Th1 and the number $N_{diff>Th2}$ of pixel blocks has been determined to be smaller than the third threshold value Th3, as a final image-quality adjusting parameter. When the number $N_{flc}$ of pixel blocks is smaller than the first threshold value Th1 and the number $N_{diff>Th2}$ of pixel blocks is smaller than the third threshold value Th3, the compression distortion of the compressed image generated based on a current image-quality adjusting parameter is sufficiently small. Therefore, the image-quality adjusting-parameter generator 122 maintains the current image-quality adjusting parameter.

On the other hand, when the number $N_{flc}$ of pixel blocks has been determined to be equal to or larger than the first threshold value Th1, the image-quality adjusting-parameter generator 122 reduces the maximum accumulated code amount $C_{maxoffset}$ by a predetermined amount. When the number $N_{flc}$ of pixel blocks is equal to or larger than the first threshold value Th1, the compression distortion of the compressed image generated based on the current image-quality adjusting parameter is large because of fixed length coding. Specifically, the image quality of the compressed image is deteriorated by degradation of gradation by fixed length coding. Therefore, the image-quality adjusting-parameter generator 122 reduces the maximum accumulated code amount $C_{maxoffset}$. Thus, it is possible to separate an actual accumulated code amount C (see FIG. 3) away from the FLC boundary code amount $C_{flc}$ in next compression. Consequently, fixed length coding hardly occurs in the next compression, so that the image quality can be improved.

Further, when the number $N_{diff>Th2}$ of pixel blocks has been determined to be equal to or larger than the third threshold value Th3, the image-quality adjusting-parameter generator 122 increases the maximum code amount $C_{max}$ by a predetermined amount. In a case where the number $N_{diff>Th2}$ of pixel blocks is equal to or larger than the third threshold value Th3, it can be considered that deterioration of the image quality occurs locally in the compressed image generated based on the current image-quality adjusting parameter. Therefore, the image-quality adjusting-parameter generator 122 increases the maximum code amount $C_{max}$. Thus, the quantization parameter QP can be made smaller in next compression, and therefore the image quality in the next compression can be improved.

(Host-Stop Determining Part 123)

The host-stop determining part 123 determines whether to cause the host apparatus 11 to stop the output of the original image based on the compression distortion (D_1) (hereinafter, also "host-stop determination").

Specifically, the host-stop determining part 123 determines whether the number $N_{flc}$ of pixel blocks for which fixed length coding has been performed is smaller than the first threshold value Th1.

The host-stop determining part 123 also determines whether the number $N_{diff>Th2}$ of pixel blocks for each of which the image difference value is larger than the second threshold value Th2 is smaller than the third threshold value Th3.

The host-stop determining part 123 then notifies the host apparatus 11 of stop of the output of the original image when the number $N_{flc}$ of pixel blocks has been determined to be smaller than the first threshold value Th1 and the number $N_{diff>Th2}$ of pixel blocks has been determined to be smaller than the third threshold value Th3. That is, the host-stop determining part 123 transmits the output-stop permission signal Sig_1 to the host apparatus 11 when the compression distortion is small. With this configuration, it is possible to bring the host apparatus 11 in a stop state by PSR.

On the other hand, when the number $N_{flc}$ of pixel blocks has been determined to be equal to or larger than the first threshold value Th1 and the number $N_{diff>Th2}$ of pixel blocks has been determined to be equal to or larger than the third threshold value Th3, the host-stop determining part 123 does not notify the host apparatus 11 of stop of the output of the original image.

That is, the host-stop determining part 123 does not transmit the output-stop permission signal Sig_1 to the host apparatus 11 when the compression distortion is large. With this configuration, it is possible to receive new original image data ID_o from the host apparatus 11 and improve the compression distortion.

A criterion for the host-stop determination is the same as a criterion for determination by the image-quality adjusting-parameter generator 122. Therefore, a functional block (a circuit element such as a comparator) for the determination may be shared by the host-stop determining part 123 and the image-quality adjusting-parameter generator 122. Such sharing of the functional block can simplify a circuit configuration of the PLC 120.

(Memory Controller 124 and Image Memory 125)

The memory controller 124 performs control of storing the compressed image (ID_e) generated by the compressor 121 based on the image-quality adjusting parameter updated by the image-quality adjusting-parameter generator 122 in the image memory 125, every time a new original image is output from the host apparatus 11.

By recording the compressed image in the image memory 125, it is possible to perform PSR using the compressed image.

(Switch 126)

The switch 126 is a multiplexer, for example. The switch 126 switches whether to output an original image from the host apparatus 11 or a decompressed image obtained by decompressing a compressed image stored in the image memory 125 by the decompressor 127.

Specifically, the switch 126 receives an image selecting signal Sig_2 that selects either the original image or the decompressed image, from the PLC 120. In a case where the image selecting signal Sig_2 selects the original image, the switch 126 outputs the original image data ID_o to the timing controller 1201. On the other hand, in a case where the image selecting signal Sig_2 selects the decompressed image, the switch 126 outputs decompressed image data ID_d to the timing controller 1201. The timing controller 1201 outputs the image (ID_o/ID_d) output from the switch 126 to the display device 13 at a predetermined timing.

The PLC 120 may output the image selecting signal Sig_2 that selects the decompressed image when outputting the output-stop permission signal Sig_1.

By the switching by the switch 126, PSR can be performed.

(Allowable-Distortion Setting Part 128)

The allowable-distortion setting part 128 sets a condition for allowing a distortion of the compressed image into the compression distortion detector 1211, the image-quality adjusting-parameter generator 122, and the host-stop determining part 123. Specifically, the allowable-distortion setting part 128 outputs data D_2 representing the condition for allowing the distortion of the compressed image (see FIG. 1B). The allowable-distortion setting part 128 receives the data D_2 from the host apparatus 11.

More specifically, the allowable-distortion setting part 128 outputs the second threshold value Th2 to the compression distortion detector 1211. The compression distortion detector 1211 detects the number $N_{diff>Th2}$ of pixel blocks for each of which the image difference value is larger than the second threshold value Th2 based on the second threshold value Th2.

Also, the allowable-distortion setting part 128 outputs the first and third threshold values Th1 and Th3 to the image-quality adjusting-parameter generator 122. The image-quality adjusting-parameter generator 122 generates the image-quality adjusting parameter based on the first and third threshold values Th1 and Th3.

Also, the allowable-distortion setting part 128 outputs the first and third threshold values Th1 and Th3 to the host-stop determining part 123. The host-stop determining part 123 determines whether to stop the host apparatus 11 based on the first and third threshold values Th1 and Th3. That is, the host-stop determining part 123 transmits the output-stop permission signal Sig_1 to the host apparatus 11 when the compression distortion input from the compression distortion detector 1211 satisfies the condition for allowing the distortion of the compressed image. The allowable-distortion setting part 128 can change the first to third threshold values Th1 to Th3 or cannot change them.

(Display Device 13)

The display device 13 includes a liquid crystal display panel 131, gate drivers 132, and source drivers 133. The display device 13 may be a TFT (Thin Film Transistor) liquid crystal display device, for example, but is not limited thereto.

The display device 13 displays an image transmitted from the semiconductor integrated circuit 12.

The display device 13 may be a display part of a smartphone or a tablet device, for example, but is not limited thereto.

(Image Transmission Processing)

Next, an operation example of the image transmission system 1 is described. FIG. 4 is a flowchart of the image transmission system 1.

First, the host apparatus 11 transmits a command for instructing compression and the original image data ID_o to the semiconductor integrated circuit 12 (S1).

The provisional coding part 1213 then performs provisional coding of the original image data ID_o sequentially in the unit of pixel blocks by using a coding parameter that is different for each pixel block (S2).

The code amount controller 1214 receives a result of the provisional coding from the provisional coding part 1213 and receives the maximum accumulated code amount $C_{maxoffset}$ and the maximum code amount $C_{max}$ as image-quality adjusting parameters from the image-quality adjusting-parameter generator 122. The code amount controller 1214 selects the most appropriate coding parameter from the result of the provisional coding based on the image-quality adjusting parameters $C_{maxoffset}$ and $C_{max}$, the result of the provisional coding for each pixel block, and Expressions (1) and (2) described above (S3).

The FLC counter 1211a then calculates the number $N_{flc}$ of pixel blocks for which fixed length coding has been performed in the provisional coding as a compression distortion, based on the result of the provisional coding for each pixel block (S4).

The coding part 1216 then generates a compressed image in such a manner that a code amount of a pixel block is equal to or smaller than the maximum code amount $C_{max}$ and an accumulated code amount is equal to or smaller than the sum of the average accumulated code amount $C_{ave}$ and the maximum accumulated code amount $C_{maxoffset}$ based on the coding parameter selected by the code amount controller 1214 (S5).

The compression-distortion adding circuit 1211b then calculates the number $N_{diff>Th2}$ of pixel blocks for each of which the image difference value is larger than the second threshold value Th2 as a compression distortion, based on the compressed image of the coding part 1216 (S6).

The host-stop determining part 123 then determines whether to cause the host apparatus 11 to stop the output of the original image based on the compression distortions. Specifically, the host-stop determining part 123 determines whether the number $N_{flc}$ of pixel blocks for which fixed length coding has been performed is smaller than the first threshold value Th1 (S7).

The host-stop determining part 123 also determines whether the number $N_{diff>Th2}$ of pixel blocks for each of which the image difference value is larger than the second threshold value Th2 is smaller than the third threshold value Th3 (S7).

When the number $N_{flc}$ of pixel blocks has been determined to be smaller than the first threshold value Th1 and the number $N_{diff>Th2}$ of pixel blocks has been determined to be smaller than the third threshold value Th3 (S7: Yes), the host-stop determining part 123 outputs the output-stop permission signal Sig_1 to the host apparatus 11 (S8). At this time, the PLC 120 outputs the image selecting signal Sig_2 that selects a decompressed image of the decompressor 127 to the switch 126.

Subsequently, the host apparatus 11 stops the output of the original image data ID_o. That is, the host apparatus 11 is stopped by PSR (S9).

The switch 126 then outputs the decompressed image of the decompressor 127 to the display device 13 (S10).

Meanwhile, when the number $N_{flc}$ of pixel blocks is equal to or larger than the first threshold value Th1 and/or the number $N_{diff>Th2}$ of pixel blocks is equal to or larger than the third threshold value Th3 (S7: No), the image-quality adjusting-parameter generator 122 updates the image-quality adjusting parameter. Specifically, when the number $N_{flc}$ of pixel blocks is equal to or larger than the first threshold value Th1, the image-quality adjusting-parameter generator 122 reduces the maximum accumulated code amount $C_{maxoffset}$ by a predetermined amount (S11). Further, when the number $N_{diff>Th2}$ of pixel blocks is equal to or larger than the third threshold value Th3, the image-quality adjusting-parameter generator 122 increases the maximum code amount $C_{max}$ (S11). The compressor 121 generates a compressed image again by using the updated image-quality adjusting parameter and waits for an opportunity for PSR.

In a case of using lossless compression in order to prevent deterioration of the image quality, a compressed frame may not be able to be stored in the image memory 125. In this case, the host apparatus 11 cannot be stopped by PSR, and therefore power cannot be reduced. On the other hand, the semiconductor integrated circuit 12 performs lossy compression that is high in a compression ratio to some extent on the assumption that the compression distortion occurs to some extent. Due to this lossy compression, it is possible to prevent the code amount from being excessive and to store the frame in the image memory 125. Therefore, the host apparatus 11 can be stopped by PSR, so that the power can be reduced. Further, because the semiconductor integrated circuit 12 can acquire next original image data ID_o from the host apparatus 11 until transmission of the output-stop permission signal Sig_1, it is possible to perform compression for a plurality of number of times. Therefore, high image quality can be achieved even by lossy compression. Therefore, according to the first embodiment, it is possible to achieve both the reduction in the power consumption and the improvement of the image quality simultaneously.

(Modification)

Next, as a modification of the first embodiment, an example of the image transmission system 1 in which the image memory 125 and the decompressor 127 are arranged outside the semiconductor integrated circuit 12 is described.

FIGS. 5A to 5C are diagrams of the image transmission system 1 according to the modification of the first embodiment. Specifically, FIG. 5A is a diagram of the semiconductor integrated circuit 12 (a first semiconductor integrated circuit), FIG. 5B is a diagram of a second semiconductor integrated circuit 1200, and FIG. 5C is a diagram of the display device 13. Illustrations of the host apparatus 11 are omitted because the configuration thereof is the same as that in FIG. 1A.

The image transmission system 1 of the present modification is different from that in FIG. 1 in that the memory controller 124, the image memory 125, the decompressor 127, and the timing controller 1201 are arranged outside the semiconductor integrated circuit 12.

Specifically, the memory controller 124, the image memory 125, the decompressor 127, and the timing controller 1201 are incorporated in the second semiconductor integrated circuit 1200.

The second semiconductor integrated circuit 1200 further includes an output selector 1202 and an input selector 1203.

The output selector 1202 is a demultiplexer, for example. An original image of the host apparatus 11 or a compressed image of the compressor 121 is input to the output selector 1202 from the switch 126 of the semiconductor integrated circuit 12. The output selector 1202 selects (switches) an output destination in accordance with the image input thereto, and outputs the original image to the input selector 1203 and the compressed image to the memory controller 124. The output selector 1202 may receive a signal or data for detecting a start of PSR from the receiver 129.

The memory controller 124 records the compressed image from the output selector 1202 to the image memory 125. Upon detection of the start of PSR, the memory controller 124 reads out the compressed image in the image memory 125, and outputs the image to the decompressor 127.

The output selector 1202 outputs a control signal for instructing selection of an input source to the input selector 1203. The output selector 1202 also outputs a control signal for instructing an image output timing to the timing controller 1201.

The input selector 1203 selects the input source in accordance with the control signal, and inputs the decompressed image from the decompressor 127 and the original image from the output selector 1202 thereto. The input selector 1203 then outputs the image from the decompressor 127 or the output selector 1202 to the timing controller 1201.

The output selector 1202 and the input selector 1203 respectively function as a switch that switches whether to output the original image or to output the decompressed image.

Further, because the semiconductor integrated circuit 12 can acquire next original image data ID_o from the host apparatus 11 until transmission of the output-stop permission signal Sig_1, it is possible to perform compression for a plurality of number of times.

Accordingly, also in the present modification, it is possible to achieve both the reduction in the power consumption and the improvement of the image quality simultaneously.

Second Embodiment

Next, as a second embodiment, an embodiment of the image transmission system 1 which processes a pixel block in an emergency mode is described. In the explanations of the second embodiment, constituent elements corresponding to those of the first embodiment are denoted by like reference characters and redundant explanations thereof will be omitted. The emergency mode is an operation mode of the compressor 121 in which an increase in the code amount is emergently suppressed. FIG. 6 is a diagram of the compressor 121 according to the second embodiment. FIG. 7 is a diagram showing code amount control by the compressor 121 in FIG. 6.

The image transmission system 1 according to the second embodiment is different from that according to the first embodiment in the configuration of the compressor 121. Specifically, the compressor 121 according to the second embodiment includes an emergency mode counter 1211c, a predicted pixel generator 1217, and a local decoding buffer 1218 in place of the provisional coding part 1213, the FLC counter 1211a, and the compression-distortion adding circuit 1211b.

The predicted pixel generator 1217 generates a pixel block to be coded this time based on the original image data ID_o input from the original image buffer 1212.

The coding part 1216 performs coding of a frame (an original image) by a combination of DCT (Discrete Cosine Transform), quantization, and variable length coding, for example, in the unit of pixel blocks generated by the predicted pixel generator 1217.

The quantization parameter satisfies Expressions (3) and (4) as follows.

$$QP(j)=k\{d_0+B(j-1)+TB(m)\times(j-1)/n\}/TB(m) \qquad (3)$$

$$TB(m)=W\times H\times BPP\times 3\times(1/CR)\times(1-m) \qquad (4)$$

QP(j) is a quantization parameter of a j-th pixel block in one frame. k and $d_0$ are coefficients. B(j−1) is a code amount of a (j−1)th pixel block. TB(m) is a target code amount. m is a margin by which the target code amount is reduced. m is an image-quality adjusting parameter in the second embodiment. n is the number of pixel blocks in one frame. W is a width of one frame (a slice width). H is a height of one frame (a slice height). BPP is a unit for representing a color depth of a pixel (bit per pixel). CR is a compression ratio. W×H×BPP×3×(1/CR) is an average code amount generated by one slice. Therefore, the target code amount of one slice is a value obtained by multiplying the average code amount by (1−m) obtained by subtracting a margin from 1.

When generating a compressed image for each pixel block sequentially, the coding part 1216 uses a code amount B(j−1) of a compressed image of a previous ((j−1)th) pixel block for calculating a quantization parameter of a current (j-th) pixel block, as shown in Expressions (3) and (4).

The coding part 1216 performs coding of the pixel block with variable length codes when the accumulated code amount is smaller than a predetermined amount (hereinafter, also "emergency mode code amount") $C_e$. On the other hand when the accumulated code amount is equal to or larger than the emergency mode code amount $C_e$, the coding part 1216 processes the pixel block in the emergency mode. In the emergency mode, it is not necessary to output a pixel block into a stream, or the pixel block as the object may be roughly coded with a fixed small code amount. Specifically, only a symbol indicating occurrence of the emergency mode is inserted into the stream, and a decompressed image is generated on a decompression side by copying a pixel in its upper line or on the left side, for example.

The emergency mode counter 1211c detects (counts) the number of pixel blocks processed in the emergency mode. Specifically, the emergency mode counter 1211c increments the number of pixel blocks processed in the emergency mode every time a pixel block is processed in the emergency mode during a process in which coding in the unit of pixel blocks is being performed. The emergency mode counter 1211c then decides the number N of pixel blocks detected at a time of termination of coding of all pixel blocks in one frame, as a compression distortion.

The local decoding buffer 1218 stores the decompressed image obtained by decompressing the compressed image generated by the coding part 1216. The decompressed image is used for compression of a next pixel block in the predicted pixel generator 1217 and the coding part 1216.

The host-stop determining part 123 determines whether the number N of pixel blocks processed in the emergency mode in one frame is smaller than a threshold value. When the number N of pixel blocks has been determined to be smaller than the threshold value, the host-stop determining part 123 transmits an output-stop permission signal Sig_1 to the host apparatus 11.

The image-quality adjusting-parameter generator 122 determines whether the number N of pixel blocks processed in the emergency mode in one frame is smaller than a threshold value. When the number N of pixel blocks has been determined to be smaller than the threshold value, the image-quality adjusting-parameter generator 122 decides a current image-quality adjusting parameter as a final image-quality adjusting parameter. On the other hand, when the number N of pixel blocks has been determined to be equal to or larger than the threshold value, the image-quality adjusting-parameter generator 122 increases the image-quality adjusting parameter m.

By increasing m, it is possible to reduce the target code amount TB(m) in Expression (4). Therefore, it is possible to increase the quantization parameter QP(j) in Expression (3) and reduce the inclination of the average code amount. Due to this processing, occurrence of the emergency mode can be suppressed in compression of the next frame, so that the image quality can be improved.

(Image Transmission Processing)

Next, an operation example of the image transmission system 1 according to the second embodiment is described. FIG. 8 is a flowchart of the image transmission system 1 according to the second embodiment.

In place of S2 and S3 in FIG. 4, the code amount controller 1214 calculates a quantization parameter in accordance with Expression (3) (S32).

In place of S4 and S5 in FIG. 4, the coding part 1216 generates a compressed image based on the quantization parameter in Expression (3) (S52).

In place of S6 in FIG. 4, the emergency mode counter 1211c calculates the number N of pixel blocks processed in the emergency mode in one frame (S62).

In place of S7 in FIG. 4, the host-stop determining part 123 determines whether the number N of pixel blocks processed in the emergency mode in one frame is smaller than a threshold value Th (S72).

When the number N of pixel blocks is smaller than the threshold value Th (S72: Yes), the process proceeds to S8 that is the same as that in FIG. 4 (transmission of the output-stop permission signal Sig_1). On the other hand, when the number N of pixel blocks is equal to or larger than the threshold value Th (S72: No), the image-quality adjusting-parameter generator 122 increases the margin m (S112), in place of S11 in FIG. 4.

Also in the second embodiment, the semiconductor integrated circuit 12 can start PSR by transmitting the output-stop permission signal Sig_1. On the other hand, because the semiconductor integrated circuit 12 can acquire next original image data ID_o from the host apparatus 11 until transmission of the output-stop permission signal Sig_1, it is possible to perform compression for a plurality of number of times.

Accordingly, also in the second embodiment, it is possible to achieve both the reduction in the power consumption and the improvement of the image quality simultaneously.

Third Embodiment

Next, as a third embodiment, the image transmission system 1 which selects an image-quality adjusting parameter in which a compression distortion becomes minimum is described. In the explanations of the third embodiment, constituent elements corresponding to those of the first embodiment are denoted by like reference characters and redundant explanations thereof will be omitted. FIG. 9 is a diagram of the image transmission system 1 according to the third embodiment. In FIG. 9, illustrations of the host apparatus 11 and the display device 13 are omitted.

The image transmission system 1 according to the third embodiment is different from that according to the first embodiment in the configuration of the PLC 120. Specifically, the PLC 120 according to the third embodiment includes an image-quality adjusting-parameter selector 1204, a compression-distortion log memory 1205, and a planned transmission number memory 1206 in addition to the components 122, 123, and 128 in the first embodiment.
(Image-Quality Adjusting-Parameter Selector 1204)

The image-quality adjusting-parameter selector 1204 selects an image-quality adjusting parameter that corresponds to a compressed image in which the compression distortion detected by the compression distortion detector 1211 becomes minimum for each of a plurality of original images. The compressor 121 generates a compressed image of an original image output from the host apparatus 11 next to the plurality of original images, by using the selected image-quality adjusting parameter.
(Compression-Distortion Log Memory 1205)

The compression-distortion log memory 1205 stores therein a pair of a compression distortion and an image-quality adjusting parameter corresponding to the compression distortion. Specifically, the compressor 121 stores a compression distortion of each compressed image and an image-quality adjusting parameter used in generation of the compressed image in the compression-distortion log memory 1205 in association with each other, during a process of compressing the original images to the compressed images sequentially.

For example, the compression-distortion log memory 1205 stores the number $N_{flc}$ of pixel blocks processed by fixed length coding and the number $N_{diff>Th2}$ of pixel blocks for each of which the image difference value is larger than the second threshold value Th2 in association with the maximum accumulated code amount $C_{maxoffset}$ and the maximum code amount $C_{max}$.

(Planned Transmission Number Memory 1206)

In the planned transmission number memory 1206, the planned number of transmissions of the original image data ID_o is recorded by the host apparatus 11 in advance. The planned number of transmissions is the number of images that are planned to be successively transmitted to the semiconductor integrated circuit 12 and is the number of frames, for example. The planned number of transmissions can be considered as the number of successive image transmissions to the semiconductor integrated circuit 12 that are planned to be performed (the number of transmissions).

The image-quality adjusting-parameter selector 1204 counts the current number of transmissions of the original image data ID_o, for example, based on the number of the compression distortions stored in the compression-distortion log memory 1205. In a case where the current number of transmissions of the original image data ID_o (the number of frames/the number of transmissions) is about to reach the planned number of transmissions, the image-quality adjusting-parameter selector 1204 selects an image-quality adjusting parameter based on information in the compression-distortion log memory 1205. Specifically, the image-quality adjusting-parameter selector 1204 may select an image-quality adjusting parameter associated with the minimum compression distortion from the compression-distortion log memory 1205 in a case where the current number of transmitted original images reaches the number that is smaller than the planned number of transmissions by one.

By selecting the image-quality adjusting parameter, it is possible to surely decide the image-quality adjusting parameter used in PSR.

The compressor 121 generates a compressed image of an original image corresponding to the planned number of transmissions by using the image-quality adjusting parameter selected in the image-quality adjusting-parameter selector 1204, and the memory controller 124 records the compressed image in the image memory 125.

After transmitting the planned number of transmissions of the original image data ID_o, the host apparatus 11 may stop transmission of the original image data ID_o to be stopped by PSR. In the third embodiment, the host-stop determining part 123 can be omitted.
(Image Transmission Processing)

Figure 10:
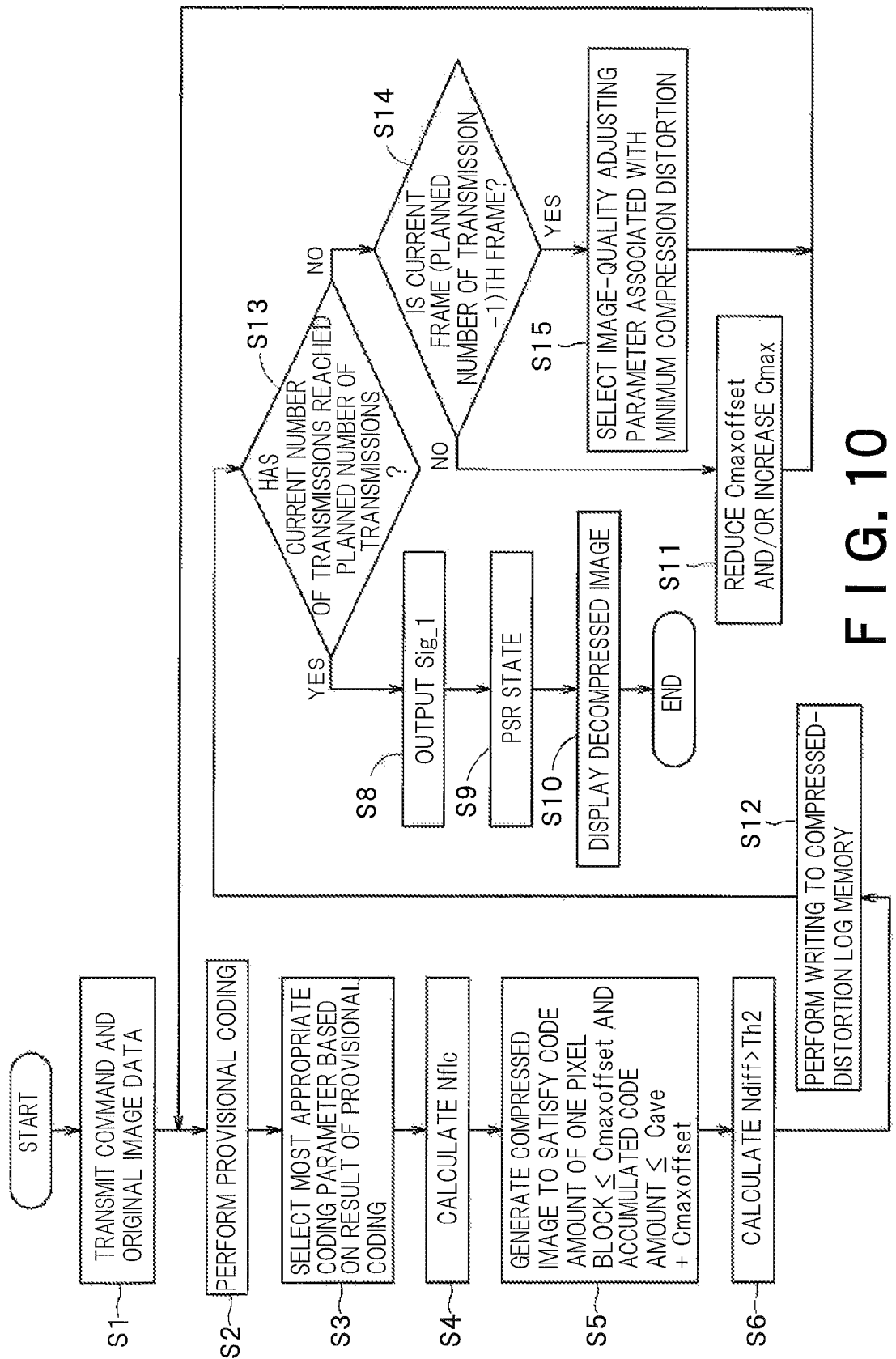
FIG. 10 is a flowchart of the image transmission system 1 in FIG. 9.

Next, an operation example of the image transmission system 1 according to the third embodiment is described. FIG. 10 is a flowchart of the image transmission system 1 according to the third embodiment.

After S6 (calculation of $N_{diff>Th2}$) in FIG. 4, the compressor 121 records a compression distortion and an image-quality adjusting parameter in the compression-distortion log memory 1205 in association with each other (S12).

After the recording of the compression distortion and the image-quality adjusting parameter in the compression-distortion log memory 1205 (S12), the image-quality adjusting parameter selector 1204 determines whether the current number of transmitted frames has reached the planned number of transmissions (S13). When the current number of transmitted frames has reached the planned number of transmissions (S13: Yes), the process proceeds to S8.

When the current number of transmitted frames has not reached the planned number of transmissions (S13: No), the image-quality adjusting-parameter selector 1204 determines whether the current number of transmitted frames has reached the number that is smaller than the planned number of transmissions by one (S14). When it has reached the number smaller than the planned number of transmissions by one (S14: Yes), the image-quality adjusting-parameter selector 1204 selects an image-quality adjusting parameter associated with the minimum compression distortion from the compression-distortion log memory 1205 (S15). On the other hand, when the current number of transmitted frames has not reached the number smaller than the planned number of transmissions by one (S14: No), the process proceeds to S11.

In some cases, the compression distortion does not decrease to such an extent as to satisfy a criterion for host-stop determination even by repeated update of the image-quality adjusting parameter. In these cases, it is likely that the image quality is significantly deteriorated if PSR is always started by using the last image-quality adjusting parameter because of a time out or a limitation on the number of transmissions on a host-apparatus 11 side. However, in the third embodiment, a history of the image-quality adjusting parameter is stored in association with the compression distortion. Therefore, even in a case where the criterion for host-stop determination is not satisfied, the image-quality adjusting parameter that is as good as possible can be acquired.

Therefore, according to the third embodiment, it is possible to further achieve the improvement of the image quality.

Fourth Embodiment

Next, as a fourth embodiment, the image transmission system 1 transmitting a non-permission signal to a host apparatus is described. In the explanations of the fourth embodiment, constituent elements corresponding to those of the third embodiment are denoted by like reference characters and redundant explanations thereof will be omitted. FIG. 11 is a diagram of the image transmission system 1 according to the fourth embodiment.

The image transmission system 1 according to the fourth embodiment is different from that according to the third embodiment in that the host-stop determining part 123 is replaced with a non-permission signal transmitting part 1230.

The non-permission signal transmitting part 1230 transmits a signal Sig_3 for not permitting stop of an output of an original image to the host apparatus 11 in a case where compression distortions of compressed images of a predetermined number of original images do not fall within a predetermined allowable range.

In the fourth embodiment, the host apparatus 11 stops transmission of the original image data ID_o, in a case where the host apparatus 11 has not receive the non-permission signal Sig_3 after transmitting the planned number of transmissions of the original image data ID_o. On the other hand, in a case where the host apparatus 11 has received the non-permission signal Sig_3 from the semiconductor integrated circuit 12, the host apparatus 11 transmits next original image data ID_o.

An operation example of the fourth embodiment is described. FIG. 12 is a flowchart of the image transmission system 1 according to the fourth embodiment.

In the fourth embodiment, an operation entity of the determination (S7) is not the host-stop determining part 123, but is the non-permission signal transmitting part 1230. The determination in S7 in the fourth embodiment can be considered as determination whether to prohibit the stop of the host apparatus 11.

In S7 in the fourth embodiment, in a case where $N_{flc}<Th1$ and $N_{diff>Th2}<Th3$ are satisfied (S7: Yes), the switch 126 outputs a decompressed image of the decompressor 127 to the display device 13 (S10). In this case, it is sufficient that the host apparatus 11 is stopped by PSR after transmission of the planned number of transmissions of the original image data ID_o.

On the other hand, in a case where $N_{flc}$ Th1 or $N_{diff>Th2}$ Th3 is satisfied (S7: No) in S7, the image-quality adjusting-parameter selector 1204 determines whether the current number of transmitted frames has reached the planned number of transmissions (S13). In a case where it has reached the planned number of transmissions (S13: Yes), the process proceeds to S10.

In a case where the current number has not reached the planned number of transmissions (S13: No), the PLC 120 determines whether the current number of transmitted frames has reached the number smaller than the planned number of transmissions by one (S14). In a case where the current number has reached the number smaller than the planned number of transmissions by one (S14: Yes), the non-permission signal transmitting part 1230 transmits the non-permission signal Sig_3 (S16). On the other hand, when the current number of transmitted frames has not reached the number smaller than the planned number of transmissions by one (S14: No), the process proceeds to S11.

Because the semiconductor integrated circuit 12 according to the fourth embodiment can acquire next original image data ID_o by transmitting the non-permission signal Sig_3, it is possible to perform compression for a plurality of number of times. Because a plurality of compressions can be performed, a high image quality can be realized. Further, by not transmitting the non-permission signal Sig_3, the host apparatus 11 can be stopped by PSR in response to termination of transmission of a predetermined number of elements of the original image data ID_o.

Accordingly, also in the fourth embodiment, it is possible to achieve both the reduction in the power consumption and the improvement of the image quality simultaneously.

Fifth Embodiment

FIG. 13 is a diagram of an image transmission system 1 according to a fifth embodiment. The semiconductor integrated circuit 12 according to the fifth embodiment is connected to the host apparatus 11 via a DisplayPort that is a standardized specification.

An original image output from the host apparatus 11 is received by a main link channel in a DisplayPort DP.

A condition for allowing a distortion of a compressed image output from the host apparatus 11 may be received by an auxiliary channel (AUX CH) in the DisplayPort DP.

The output-stop permission signal Sig_1 and the non-permission signal Sig_3 may be hot-plug-detect signals.

According to the fifth embodiment, it is possible to achieve both the reduction in the power consumption and the improvement of the image quality simultaneously conforming to an existing interface specification.

The first to fifth embodiments can be combined appropriately. For example, the compression in accordance with the emergency mode in the second embodiment can be applied to the third or fourth embodiment.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A semiconductor integrated circuit comprising:
   a compressor generating a compressed image of an original image output from a host apparatus based on an image-quality adjusting parameter;
   a compression distortion detector detecting a compression distortion of the compressed image;
   an image-quality adjusting-parameter generator updating the image-quality adjusting parameter based on the compression distortion; and
   an image-quality adjusting-parameter selector selecting the image-quality adjusting parameter corresponding to the compressed image in which the compression distortion becomes minimum in a plurality of compressed images obtained by compressing each of a plurality of original images using the image-quality adjusting parameter updated by the image-quality adjusting-parameter generator, the plurality of original images being smaller in number by one than a planned number of transmitted original images and the plurality of original images output successively from the host apparatus, wherein
   the compressor generates the compressed image of the original image corresponding to the planned number of transmitted original images output from the host apparatus next in time to the plurality of original images by using the selected image-quality adjusting parameter.

2. The semiconductor integrated circuit according to claim 1, further comprising a host-stop determining part determining whether to cause the host apparatus to stop an output of the original image based on the compression distortion.

3. The semiconductor integrated circuit according to claim 2, further comprising an allowable-distortion setting part setting a condition for allowing the compression distortion of the compressed image, wherein
   the host-stop determining part transmits a permission signal for stop of an output of the original image to the host apparatus in a case where the compression distortion satisfies the condition.

4. The semiconductor integrated circuit according to claim 3, wherein
   the semiconductor integrated circuit is connected to the host apparatus via a DisplayPort, and
   the host-stop determining part transmits a hot-plug-detect signal of the DisplayPort as the permission signal.

5. The semiconductor integrated circuit according to claim 1, further comprising a memory controller performing control of storing the compressed image generated by the compressor based on the updated image-quality adjusting parameter in an image memory, every time a new original image is output from the host apparatus.

6. The semiconductor integrated circuit according to claim 5, further comprising:
   a decompressor generating a decompressed image of the compressed image stored in the image memory; and
   a switch switching whether to output the original image output from the host apparatus or the decompressed image.

7. The semiconductor integrated circuit according to claim 1, further comprising an allowable-distortion setting part setting a condition for allowing the compression distortion of the compressed image, wherein
   the image-quality adjusting-parameter generator generates the image-quality adjusting parameter based on the condition and the compression distortion.

8. The semiconductor integrated circuit according to claim 7, wherein
   the semiconductor integrated circuit is connected to the host apparatus via a DisplayPort, and
   the allowable-distortion setting part receives the condition in an auxiliary channel in the DisplayPort from the host apparatus.

9. The semiconductor integrated circuit according to claim 1, wherein
   the compressor further comprises a compression-distortion log memory storing a plurality of sets of compression distortions of the compressed images and image-quality adjusting parameters respectively used in generation of the compressed images, and
   the image-quality adjusting-parameter selector selects the image-quality adjusting parameter based on information stored in the compression-distortion log memory.

10. The semiconductor integrated circuit according to claim 9, further comprising a planned transmission number memory in which the planned number of transmitted original images is recorded by the host apparatus, wherein
    the image-quality adjusting-parameter selector selects an image-quality adjusting parameter associated with a minimum compression distortion from the compression-distortion log memory in a case where a current number of transmitted original images has reached a number smaller than the planned number of transmitted original images by one, and
    the compressor generates a compressed image of an original image corresponding to the planned number of transmitted original images by using the selected image-quality adjusting parameter.

11. The semiconductor integrated circuit according to claim 1, further comprising a memory controller performing control of storing the compressed image generated using the selected image-quality adjusting parameter in an image memory.

12. The semiconductor integrated circuit according to claim 1, further comprising a non-permission signal transmitting part transmitting a non-permission signal for stop of an output of an original image to the host apparatus in a case where compression distortions of the compressed images for a predetermined number of original images do not fall within a predetermined allowable range.

13. The semiconductor integrated circuit according to claim 12, wherein
    the semiconductor integrated circuit is connected to the host apparatus via a DisplayPort, and
    the non-permission signal transmitting part transmits a hot-plug-detect signal of the DisplayPort as the non-permission signal.

14. The semiconductor integrated circuit according to claim 1, wherein
    the semiconductor integrated circuit is connected to the host apparatus via a DisplayPort, and
    the original image is received by a main link channel in the DisplayPort.

15. An image transmission apparatus comprising:
    a compressor generating a compressed image of an original image output from a host apparatus based on an image-quality adjusting parameter;
    a compression-distortion detector detecting a compression distortion of the compressed image;

an image-quality adjusting-parameter generator updating the image-quality adjusting parameter based on the compression distortion;
an image memory storing the compressed image generated by the compressor based on the updated image-quality adjusting parameter;
a decompressor decompressing the compressed image output from the image memory; and
an image-quality adjusting-parameter selector selecting the image-quality adjusting parameter corresponding to the compressed image in which the compression distortion becomes minimum in a plurality of compressed images obtained by compressing each of a plurality of original images using the image-quality adjusting parameter updated by the image-quality adjusting-parameter generator, the plurality of original images being smaller in number by one than a planned number of transmitted original images and the plurality of original images output successively from the host apparatus, wherein
the compressor generates the compressed image of the original image corresponding to the planned number of transmitted original images output from the host apparatus next in time to the plurality of original images by using the selected image-quality adjusting parameter.

16. An image transmission system comprising:
a host apparatus outputting an original image;
a compressor generating a compressed image of the original image based on an image-quality adjusting parameter;
a compression-distortion detector detecting a compression distortion of the compressed image;
an image-quality adjusting-parameter generator updating the image-quality adjusting parameter based on the compression distortion;
an image memory storing the compressed image generated by the compressor based on the updated image-quality adjusting parameter;
a decompressor decompressing the compressed image output from the image memory; and
an image-quality adjusting-parameter selector selecting the image-quality adjusting parameter corresponding to the compressed image in which the compression distortion becomes minimum in a plurality of compressed images obtained by compressing each of a plurality of original images using the image-quality adjusting parameter updated by the image-quality adjusting-parameter generator, the plurality of original images being smaller in number by one than a planned number of transmitted original images and the plurality of original images output successively from the host apparatus, wherein
the compressor generates the compressed image of the original image corresponding to the planned number of transmitted original images output from the host apparatus next in time to the plurality of original images by using the selected image-quality adjusting parameter.

* * * * *